United States Patent
Raveendran

(10) Patent No.: US 8,908,763 B2
(45) Date of Patent: Dec. 9, 2014

(54) FRAGMENTED REFERENCE IN TEMPORAL COMPRESSION FOR VIDEO CODING

(75) Inventor: Vijayalakshmi R. Raveendran, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1681 days.

(21) Appl. No.: 12/145,900

(22) Filed: Jun. 25, 2008

(65) Prior Publication Data

US 2009/0323809 A1 Dec. 31, 2009

(51) Int. Cl.
*H04N 11/20* (2006.01)

(52) U.S. Cl.
USPC ............. 375/240.12; 375/240.16; 375/240.22

(58) Field of Classification Search
USPC ........................... 375/240.12, 240.16, 240.22
See application file for complete search history.

(56) References Cited

U.S. PATENT DOCUMENTS

| | | | |
|---|---|---|---|
| 5,655,009 A | 8/1997 | Arai et al. | |
| 6,366,615 B2 | 4/2002 | Kato et al. | |
| 6,408,099 B2 | 6/2002 | Tan | |
| 6,507,618 B1 | 1/2003 | Wee et al. | |
| 6,968,441 B1 | 11/2005 | Schnee | |
| 7,111,177 B1 | 9/2006 | Chauvel et al. | |
| 7,142,204 B2 | 11/2006 | Shiotsu et al. | |
| 7,337,339 B1 | 2/2008 | Choquette et al. | |
| 7,376,437 B2 | 5/2008 | Molkdar et al. | |
| 7,450,963 B2 | 11/2008 | Krishnan et al. | |
| 7,721,011 B1 | 5/2010 | Sutera | |
| 7,885,926 B2 | 2/2011 | Grace et al. | |
| 7,920,584 B2 | 4/2011 | Matterne et al. | |
| 7,961,756 B1 | 6/2011 | Lambert et al. | |
| 8,041,967 B2 | 10/2011 | Belady et al. | |
| 8,125,936 B2 | 2/2012 | Bar-Shalom | |
| 8,126,461 B2 | 2/2012 | Sengupta et al. | |

(Continued)

FOREIGN PATENT DOCUMENTS

| | | |
|---|---|---|
| CN | 1394443 A | 1/2003 |
| CN | 1122908 C | 10/2003 |

(Continued)

OTHER PUBLICATIONS

ITU-T H.264, Series H: Audiovisual and Multimedia Systems Infrastructure of audiovisual services—Coding of moving video, "Advanced video coding for generic audiovisual services," Nov. 2007: Sections 7.3.5, 7.4.5.3.2, 8.2, 8.3 & 9.1.

(Continued)

*Primary Examiner* — Andrew Lee
(74) *Attorney, Agent, or Firm* — Brent A. Boyd

(57) ABSTRACT

In general, this disclosure describes techniques for encoding and decoding sequences of video frames using fragmentary reference pictures. The disclosure presents video encoding and decoding techniques for modified temporal compression based on fragmented references rather than complete reference pictures. In a typical sequence of video frames, only a portion (i.e., a tile) of each frame includes moving objects. Moreover, in each frame, the moving objects tend to be confined to specific areas that are common among each frame in the sequence of video frames. As described herein, such common areas of motion are identified. Pictures are then extracted from the identified areas of the video frames. Because these pictures may represent only portions of the frames, this disclosure refers to these pictures as "fragments." It is then these fragments that are used as reference pictures for generating predicted frames during a motion compensation process, rather than the entire frame.

40 Claims, 17 Drawing Sheets

(56) References Cited

U.S. PATENT DOCUMENTS

| | | | |
|---|---|---|---|
| 8,159,520 | B1 | 4/2012 | Dhanoa et al. |
| 8,225,112 | B2 | 7/2012 | Koul et al. |
| 2001/0004404 | A1 | 6/2001 | Itokawa |
| 2003/0007566 | A1 | 1/2003 | Peng et al. |
| 2003/0108100 | A1 | 6/2003 | Sekiguchi et al. |
| 2003/0217295 | A1 | 11/2003 | Sadowski |
| 2004/0041538 | A1 | 3/2004 | Sklovsky |
| 2004/0142733 | A1 | 7/2004 | Parise |
| 2004/0158878 | A1 | 8/2004 | Ratnakar et al. |
| 2005/0101319 | A1 | 5/2005 | Murali et al. |
| 2005/0136961 | A1 | 6/2005 | Simonsson et al. |
| 2005/0237380 | A1* | 10/2005 | Kakii et al. ............... 348/14.12 |
| 2005/0276504 | A1* | 12/2005 | Chui et al. ................. 382/264 |
| 2006/0015508 | A1* | 1/2006 | Kondo et al. .................. 707/10 |
| 2006/0085794 | A1 | 4/2006 | Yokoyama |
| 2006/0095942 | A1 | 5/2006 | van Beek |
| 2006/0133495 | A1 | 6/2006 | Ye et al. |
| 2006/0291812 | A1 | 12/2006 | Takezaki |
| 2007/0021140 | A1 | 1/2007 | Keyes et al. |
| 2007/0050647 | A1 | 3/2007 | Conroy et al. |
| 2007/0116124 | A1 | 5/2007 | Wu et al. |
| 2007/0150592 | A1 | 6/2007 | Bell |
| 2007/0173283 | A1 | 7/2007 | Livet et al. |
| 2007/0220291 | A1 | 9/2007 | Stufflebeam |
| 2007/0226522 | A1 | 9/2007 | Aleksic et al. |
| 2007/0283128 | A1 | 12/2007 | Hoshaku |
| 2007/0297511 | A1 | 12/2007 | Chiu et al. |
| 2008/0010473 | A1 | 1/2008 | Harris |
| 2008/0074537 | A1* | 3/2008 | Kageyama et al. ........... 348/441 |
| 2008/0084491 | A1 | 4/2008 | He et al. |
| 2008/0111889 | A1* | 5/2008 | Fujita et al. ............... 348/208.5 |
| 2008/0252717 | A1* | 10/2008 | Moon et al. ..................... 348/36 |
| 2008/0301474 | A1 | 12/2008 | Bussa et al. |
| 2008/0307240 | A1 | 12/2008 | Dahan et al. |
| 2009/0034941 | A1* | 2/2009 | Kageyama et al. ........... 386/126 |
| 2009/0059899 | A1 | 3/2009 | Bendelac |
| 2009/0091653 | A1* | 4/2009 | Kageyama et al. ........... 348/441 |
| 2009/0270138 | A1 | 10/2009 | Raveendran |
| 2009/0296815 | A1* | 12/2009 | Ngan et al. ............... 375/240.16 |
| 2010/0011012 | A1 | 1/2010 | Rawson |
| 2010/0046631 | A1 | 2/2010 | Raveendran |
| 2010/0046637 | A1 | 2/2010 | Raveendran |
| 2012/0047359 | A1 | 2/2012 | Raveendran |
| 2012/0054772 | A1 | 3/2012 | Raveendran |

FOREIGN PATENT DOCUMENTS

| | | |
|---|---|---|
| CN | 1522074 A | 8/2004 |
| CN | 1522541 A | 8/2004 |
| CN | 1523893 A | 8/2004 |
| CN | 1679218 A | 10/2005 |
| CN | 1695378 A | 11/2005 |
| EP | 0912063 A2 | 4/1999 |
| EP | 1096360 A1 | 5/2001 |
| EP | 1578136 A2 | 9/2005 |
| EP | 1924099 A1 | 5/2008 |
| JP | 5268275 A | 10/1993 |
| JP | 2001177827 A | 6/2001 |
| JP | 2001229040 A | 8/2001 |
| JP | 2003134156 A | 5/2003 |
| JP | 2004242308 A | 8/2004 |
| JP | 2005300943 A | 10/2005 |
| JP | 2005303738 A | 10/2005 |
| JP | 2005537546 A | 12/2005 |
| JP | 2006101322 A | 4/2006 |
| JP | 2006113767 A | 4/2006 |
| JP | 2007013315 A | 1/2007 |
| JP | 2007328461 A | 12/2007 |
| JP | 2008042566 A | 2/2008 |
| JP | 2008124646 A | 5/2008 |
| JP | 2008526119 A | 7/2008 |
| JP | 2009527133 A | 7/2009 |
| JP | 2009532990 | 9/2009 |
| JP | 2010136383 | 6/2010 |
| KR | 20030061798 A | 7/2003 |
| KR | 20040072030 A | 8/2004 |
| RU | 2189120 C2 | 9/2002 |
| RU | 2305377 C2 | 8/2007 |
| TW | 1246645 B | 1/2006 |
| TW | 200805047 A | 1/2008 |
| TW | 200813701 A | 3/2008 |
| TW | 200814787 A | 3/2008 |
| WO | 9810593 A2 | 3/1998 |
| WO | WO0219095 A2 | 3/2002 |
| WO | WO03005729 A1 | 1/2003 |
| WO | WO03050758 A2 | 6/2003 |
| WO | WO2006001490 | 1/2006 |
| WO | 06069297 | 6/2006 |
| WO | WO2006109985 A1 | 10/2006 |
| WO | 2007078663 A2 | 7/2007 |
| WO | 07115126 | 10/2007 |

OTHER PUBLICATIONS

International Search Report and Written Opinion—PCT/US2009/048506, International Search Authority—European Patent Office—Nov. 30, 2009.

Thomas Sikora, "The MPEG-4 Video Standard Verification Model" IEEE Transactions on Circuits and Systems for Video Technology, IEEE Service Center, Piscataway, NJ, US, vol. 7, No. 1, Feb. 1, 1997, XP011014363 ISSN: 1051-8215.

Wu Si., et al., "A fast and adaptive interpolation method for video coding" Consumer Electronics, 2005. (ISCE 2005) Proceedings of the Ninth International Symposium on Macau SAR Jun. 14-16, 2005, Piscataway, NJ, SA,IEEE, Jun. 14, 2005, pp. 80-82, XP010873 2121 ISBN: 978-0-7803-8920-5.

Ya-Ting Yang., et al., "Quality Enhancement of Frame Rate Up-Converted Video by Adaptive Frame Skip and Reliable Motion Extraction" IEEE Transactions on Circuits and Systems for Video Technology, IEEE Service Center, Piscataway, NJ, US, vol. 17, No. 12, Dec. 1, 2007, pp. 1700-1713, XP011195144 ISSN: 1051-8215.

Erkip et al., "Total Power Optimization for Wireless Multimedia Communication," in System Level Power Optimization for Wireless Multimedia Communication, vol. Chapter 1, p. No. 1-20, 2002.

Erkip et al., "Total Power Optimization For Wireless Multimedia Communication," In System Level Power Optimization for Wireless Multimedia Communication, vol. Chapter1, page No. 1-20, 2002.

Lu, et al., "Power Efficient Multimedia Communication Over Wireless Channels" IEEE Journal on Selected Areas in Communications, vol. 21, No. 10, pp. 1738-1751, Dec. 2003.

MPEG-4 Video Verification Model Version 7.0, ISO/IEC/JTC1/SC29/WG11, MPEG97/N1642, No. N1642, Apr. 1, 1997, pp. 19-23, 34-37, 40-54, 86-94, found in Internet at www.cs.sfu.ca/fas-info/cs/CC/880/li/raaterial/postscript/vm7.ps.Z.

Vijayalakshmi Raveendran, "Power and Computational Load Management Techniques in Video Processing" U.S. Appl. No. 12/336,347, filed Dec. 16, 2008.

Vijayalakshmi Raveendran, "Power and Computational Load Management Techniques in Video Processing" U.S. Appl. No. 12/336,362, filed Dec. 16, 2008.

Jinzenji Kumi et al., "Automatic VOP Generation and its Application to MPEG-4 Coding", Picture Coding Symposium of Japan (PCSJ99), 14th Symposium Document, Japan, the Institute of Electronics, Information and Communication Engineers, Image Engineering Research Expert Committee, Sep. 1999, pp. 73 and 74.

"Special Topic 1, MPEG4 Newest Animation Format and its Technology", C MAGAZINE, Japan, SOFTBANK Publishing Inc., Jan. 1, 2004 (vol. 16, No. 1), pp. 16-37.

Sakai Y., et al., "An Adaptive Video Flow Control Method for Multimedia Terminals," Journal of The Information Processing Society of Japan, Sep. 2000, vol. 41 (9), pp. 2455-2466, ISSN: 0387-5806.

Taiwan Search Report—TW098121439—TIPO—Dec. 2, 2013.

\* cited by examiner

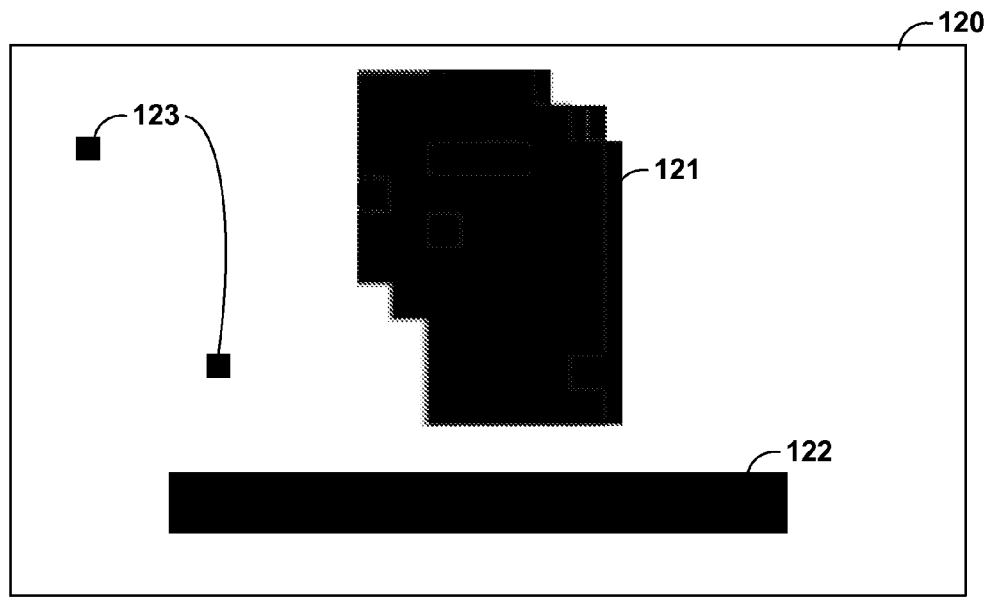
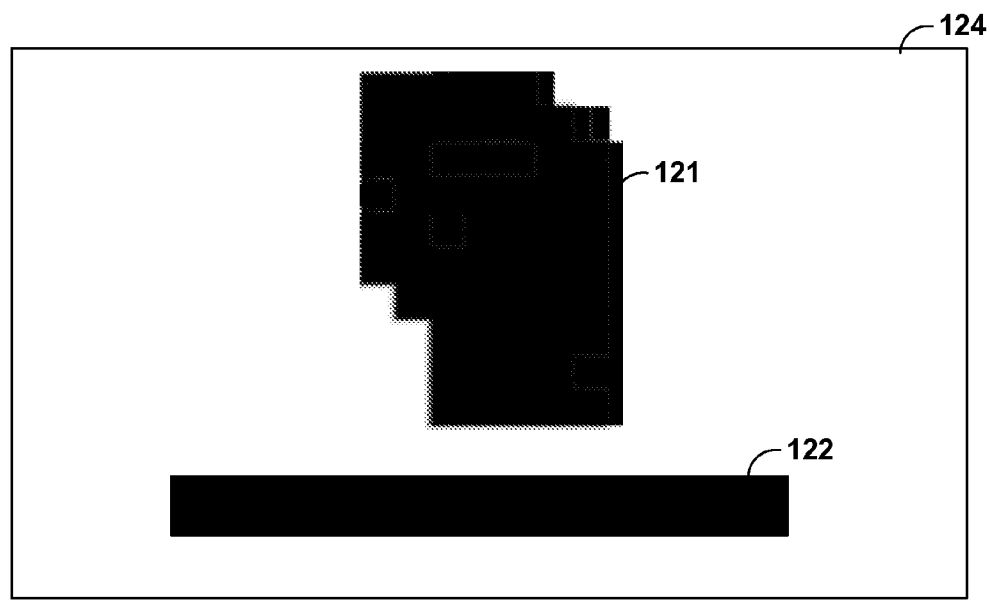
FIG. 5D

FRAGMENTED REFERENCE IN TEMPORAL COMPRESSION FOR VIDEO CODING

TECHNICAL FIELD

The disclosure relates to multimedia signal processing and, more particularly, to video encoding and decoding.

BACKGROUND

Digital multimedia capabilities can be incorporated into a wide range of devices, including digital televisions, digital direct broadcast systems, wireless communication devices, wireless broadcast systems, personal digital assistants ("PDAs"), laptop or desktop computers, digital cameras, digital recording devices, video gaming devices, video game consoles, cellular or satellite radio telephones, and the like. Digital multimedia devices may implement video coding techniques, such as techniques defined by the MPEG-2, MPEG-4, or ITU H.264/MPEG-4, Part 10, Advanced Video Coding ("AVC") standards, to transmit and receive digital video data more efficiently. Video coding techniques may perform video compression via spatial and temporal prediction to reduce or remove redundancy inherent in video sequences.

In order to perform video compression via temporal prediction, a video encoder may use a motion compensation process. In a motion compensation process, a video encoder divides a current video frame into a set of macroblocks. Then, for each macroblock of the current video frame, the video encoder attempts to identify one or more macroblocks in one or more reference frames that contain approximately the same data as the macroblock in the current video frame. If the video encoder successfully identifies such a macroblock in the reference frame, the video encoder may generate a motion vector that indicates a displacement between the identified macroblock in the reference frame and the macroblock in the current frame. If the video encoder does not successfully identify such a macroblock in the reference frame, the video encoder may generate a motion vector that indicates no displacement. Next, the video encoder may generate a predictive frame by "moving" the identified macroblocks from positions in the reference frame to positions indicated by the motion vectors. After generating the predictive frame, the video encoder may generate a residual frame by subtracting, on a macroblock-by-macroblock basis, the predictive frame from the current frame to indicate residual differences between the corresponding blocks. The video encoder may then encode the residual frame along with its associated motion vectors. Next, the video encoder may output the encoded residual frame and the associated motion vectors for use by a decoder.

To decode a video frame that has been encoded using a motion compensation process, a video decoder may retrieve a reference frame indicated by the motion vectors. The video decoder may then "move" macroblocks of the reference frame indicated by the motion vectors to positions indicated by the motion vectors. As a result of moving the macroblocks of the reference frame, the video decoder generates a predictive frame. The video decoder may then generate a reconstructed video frame by adding the predictive frame to a decoded version of the received residual frame.

SUMMARY

In general, this disclosure describes techniques for encoding and decoding sequences of video frames using fragmentary reference pictures. The disclosure presents video encoding and decoding techniques for modified temporal compression based on fragmented references rather than complete reference pictures. In a typical sequence of video frames, only a portion (i.e., a tile) of each frame includes moving objects. Moreover, in each frame, the moving objects tend to be confined to specific areas that are common among each frame in the sequence of video frames. As described herein, such common areas of motion are identified. Pictures are then extracted from the identified areas of the video frames. Because these pictures may represent only portions of the frames, this disclosure refers to these pictures as "fragments." It is then these fragments that are used as reference pictures for generating predicted frames during a motion compensation process, rather than the entire frame.

In one example, a method comprises storing reference fragments comprising video data associated with a set of tiles of video frames in a sequence of video frames. Each tile in the set of tiles represents a subset of partitions for the respective video frame. The method also comprises performing motion compensation for a current tile of a current video frame based on one or more of the reference fragments.

In another example, a device comprises a reference buffer that stores reference fragments comprising video data associated with a set of tiles of video frames in a sequence of video frames. Each tile in the set of tiles represents a subset of partitions for the respective video frame. The device also comprises a motion compensation unit that performs motion compensation for a current tile of a current video frame based on one or more of the reference fragments.

In another example, a device comprises means for storing reference fragments comprising video data associated with a set of tiles of video frames in a sequence of video frames. Each tile in the set of tiles represents a subset of partitions for the respective video frame. The device also comprises means for performing motion compensation for a current tile of a current video frame based on one or more of the reference fragments.

In another example, an integrated circuit comprises circuitry that stores reference fragments comprising video data associated with a set of tiles of video frames in a sequence of video frames. Each tile in the set of tiles represents a subset of partitions for the respective video frame. In addition, the integrated circuit comprises circuitry that performs motion compensation for a current tile of a current video frame based on one or more of the reference fragments.

The techniques described in this disclosure may be implemented in hardware, software, firmware, or any combination thereof. If implemented in software, the software may be executed using one or more processors, such as a microprocessor, application specific integrated circuit (ASIC), field programmable gate array (FPGA), or digital signal processor (DSP). The software that executes the techniques may be initially stored in a computer-readable medium and loaded and executed using the processor.

Accordingly, this disclosure also contemplates a computer-readable medium that comprises executable instructions. When executed by one or more processors, the instructions cause the one or more processors to store reference fragments comprising video data associated with a set of tiles of video frames in a sequence of video frames. Each tile in the set of tiles represents a subset of partitions for the respective video frame. The instructions also cause the one or more processors to perform motion compensation for a current tile of a current video frame based on one or more of the reference fragments.

In some cases, the computer-readable medium may form at least part of a computer program product, which may be sold and/or used in a video coding device. The computer program product may include the computer-readable medium, and in some cases, may also include packaging materials.

The techniques for encoding and decoding sequences of video frames using fragmentary reference pictures will be primarily described in the context of motion compensation coding techniques. However, the use of fragmentary reference pictures, as described herein, may also be used in other coding contexts, such as for scaling, edge enhancement, or the like.

The details of one or more examples are set forth in the accompanying drawings and the description below. Other features, objects, and advantages will be apparent from the description and drawings, and from the claims.

BRIEF DESCRIPTION OF DRAWINGS

FIG. 5D illustrates the effect of mode smoothing on a partition activity map.

DETAILED DESCRIPTION

Figure 1:
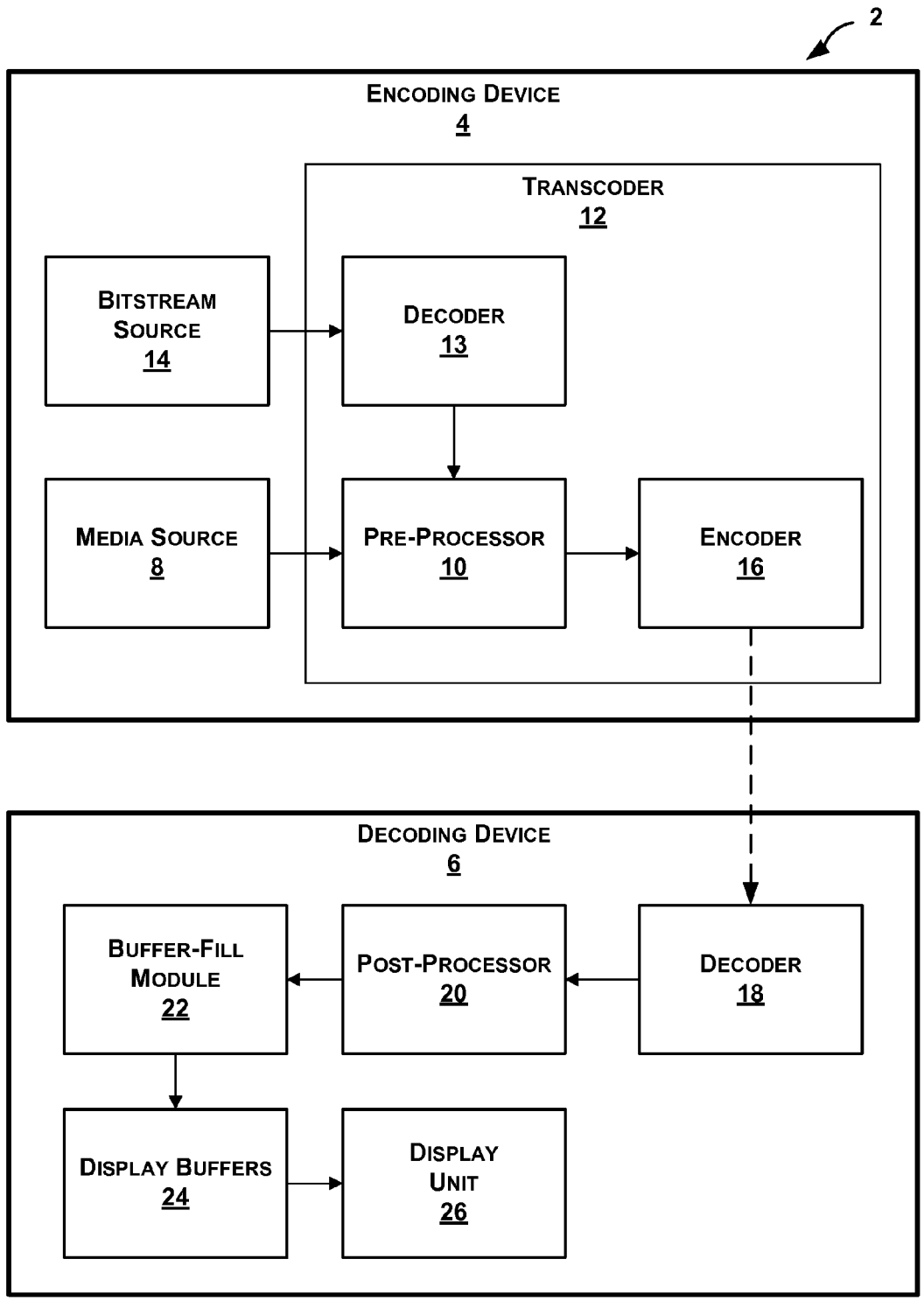
FIG. 1 is a block diagram illustrating an exemplary video encoding and decoding system.

FIG. 1 is a block diagram illustrating an exemplary video encoding and decoding system 2. As illustrated in the example of FIG. 1, system 2 includes an encoding device 4 and a decoding device 6. In general terms, encoding device 4 is capable of encoding video data and decoding device 6 is capable of decoding video data encoded by encoding device 4 or another encoding device. Encoding device 4 and decoding device 6 may be any of a wide variety of devices. For example, encoding device 4 and decoding device 6 may be personal computers, network servers, personal digital assistants ("PDAs"), video game devices, personal media players, mobile telephones, digital cameras, digital camcorders, or other types of devices. Alternatively, a single device may incorporate the functionality of encoding device 4 and/or the functionality of decoding device 6.

As illustrated in the example of FIG. 1, encoding device 4 includes a media source 8. Media source 8 outputs unencoded video data (i.e., video data that has not been encoded using an encoding process described herein). Media source 8 may be any of a wide variety of software and/or hardware units that output unencoded video data. For example, media source 8 may be a digital video camera, a digital still camera, a memory module storing unencoded video data, an interface that receives unencoded video data from a cable, terrestrial, or satellite television provider, or other types of software and/or hardware units that output unencoded video data. Moreover, media source 8 may be communicatively coupled to encoding device 4 via one or more wired or wireless connections. Media source 8 may provide unencoded video data to a pre-processor 10.

Furthermore, in the example of FIG. 1, encoding device 4 may include a transcoder 12. In general, transcoder 12 receives video data outputted by a bitstream source 14. The video data outputted by bitstream source 14 may be encoded in a first format. For example, bitstream source 14 may output video data formatted in a Serial Digital Interface format. When transcoder 12 receives the video data outputted by bitstream source 14, a decoder 13 in transcoder 12 may decode the video data received from transcoder 12, thereby generating an uncompressed sequence of video frames. After decoder 13 decodes the video data, decoder 13 may provide the decoded video data to a pre-processor 10 that performs one or more video pre-processing operations on the decoded video data. An encoder 16 in transcoder 12 may then encode the pre-processed video data in a second format that is different than the first format. As used in this disclosure, the term "format" may refer to a data encoding format or a data presentation format. In this way, transcoder 12 transcodes the video generated by bitstream source 14 from the first format to the second format. For example, transcoder 12 may transcode the video generated by bitstream source 14 from the H.263 standard to the H.264 standard. In another example, transcoder 12 may transcode the video generated by bitstream source 14 from a first resolution (e.g., H.264 SD) to a second resolution (H.264 QVGA).

Pre-processor 10 may perform a variety of video pre-processing operations on the unencoded video data. For example, pre-processor 10 may perform interlacing operations, de-interlacing operations, contrast adjustment operations, noise reduction operations, and/or other types of video pre-processing operations on the unencoded video data.

After pre-processor 10 performs the one or more video pre-processing operations on the unencoded video data, pre-processor 10 may provide the pre-processed video data to an encoder 16. Encoder 16 encodes the pre-processed video data, thereby creating encoded video data. After encoder 16 encodes the pre-processed video data, encoding device 4 may do a wide variety of things with the encoded video data. In one example, encoding device 4 may store the encoded video data as a media file or other type of media object in a storage medium (not shown) such as random access memory, an optical disk, a magnetic disk, flash memory, electrically-erasable programmable read-only memory, or other types of memory modules. In another example, encoding device 4 may output the encoded video data as one of several different types of media objects. For example, encoding device 4 may output the encoded video data as a live stream of audio/video data. In another example, encoding device 4 may output the encoded video data as a media file that may or may not be capable of progressive playback. When encoding device 4 outputs the encoded video data, encoding device 4 may transmit the encoded video data using a computer network, a wireless broadcast transmitter, a coaxial cable, a fiber optic cable, or another type of communication mechanism.

A decoder 18 in decoding device 6 may decode video data encoded by encoding device 4. In general, decoder 18 reverses the encoding process that encoder 16 applied to the video data. After decoder 18 decodes the video data, a post-processor 20 in decoding device 6 performs one or more post-processing operations on the decoded video data. For example, post-processor 20 may perform post-processing operations that include gamma correction operations, sharpening operations, and other post-processing operations. After post-processor 20 performs the post-processing operations on the video data, a buffer fill module 22 in decoding device 6 may store the video data in a set of one or more display buffers 24. For instance, buffer fill module 22 may store individual frames of the post-processed video data into individual ones of display buffers 24. Display buffers 24 may be implemented as one or more computer-readable media (e.g., random-access memory, flash memory units, or other types of computer-readable media).

A display unit 26 in decoding device 6 may display video data in display buffers 24. Display unit 26 may be one or more of a variety of types of display unit. For instance, display unit 26 may be a cathode ray tube ("CRT") monitor or television set, a liquid crystal display ("LCD"), an organic light-emitting diode ("OLED") display, a conventional light-emitting diode display, Plasma display or another type of display. Although illustrated in the example of FIG. 1 as being included within decoding device 6, display unit 26 may be external to decoding device 6. For instance, display unit 26 may be connected to decoding device 6 via one or more cables and/or one or more wireless links.

As described herein, pre-processor 10, encoder 16, decoder 18, and post-processor 20 may, independently or in conjunction, use video tile identification techniques to reduce or restore temporal redundancy among video frames in a set of video frames. In general, these video tile identification techniques involve the identification of one or more sets of tiles of video frames in a sequence of video frames. A tile is an area of a video frame. For example, a tile may be a rectangular area of a video frame that is twenty pixels wide, thirty pixels high, and has an upper-left pixel that is five columns from the left edge of the video frame and seventy rows from the top edge of the video frame (i.e., the upper-left pixel has coordinates (5, 70)). Tiles in at least one of the sets of tiles are regions of video frames that may or may not include the entire video frame.

After identifying the tiles, fragments may be extracted from each of the video frames. As used in this disclosure, a "fragment" is a picture contained within a tile of a video frame. For example, let a tile of a video frame be a rectangular area of a video frame that is twenty pixels wide and thirty pixels high. The upper-left pixel of the region has coordinates (5, 70). In this example, a fragment extracted from this tile is an independent picture that is twenty pixels wide and thirty pixels high. Furthermore, in this example, the upper-left pixel of the fragment (i.e., the pixel of the fragment having coordinates (0, 0)) has the same pixel values as the pixel of the video frame having coordinates (5, 70). Similarly, the pixel of the fragment having coordinates (1, 0) has the same pixel values as the pixel of the video frame having coordinates (6, 70), and so on.

When the fragments have been extracted from the video frames, operations regarding the video frames may be performed with regard only to the fragments. For example, when performing a pre-processing operation with regard to a video frame, pre-processor 10 may only perform the pre-processing operations on fragments. In another example, encoder 16 and decoder 18 may use the fragments as references during motion compensation operations. After the operations are performed, the frames may be reassembled (i.e., rendered) by compositing the processed fragments onto a previously decoded complete video frame. This is possible because all portions of a frame that are not within one of the identified tiles may be assumed to be the same as the portions of the previously decoded complete video frame that are not within one of the identified tiles.

Figure 2:
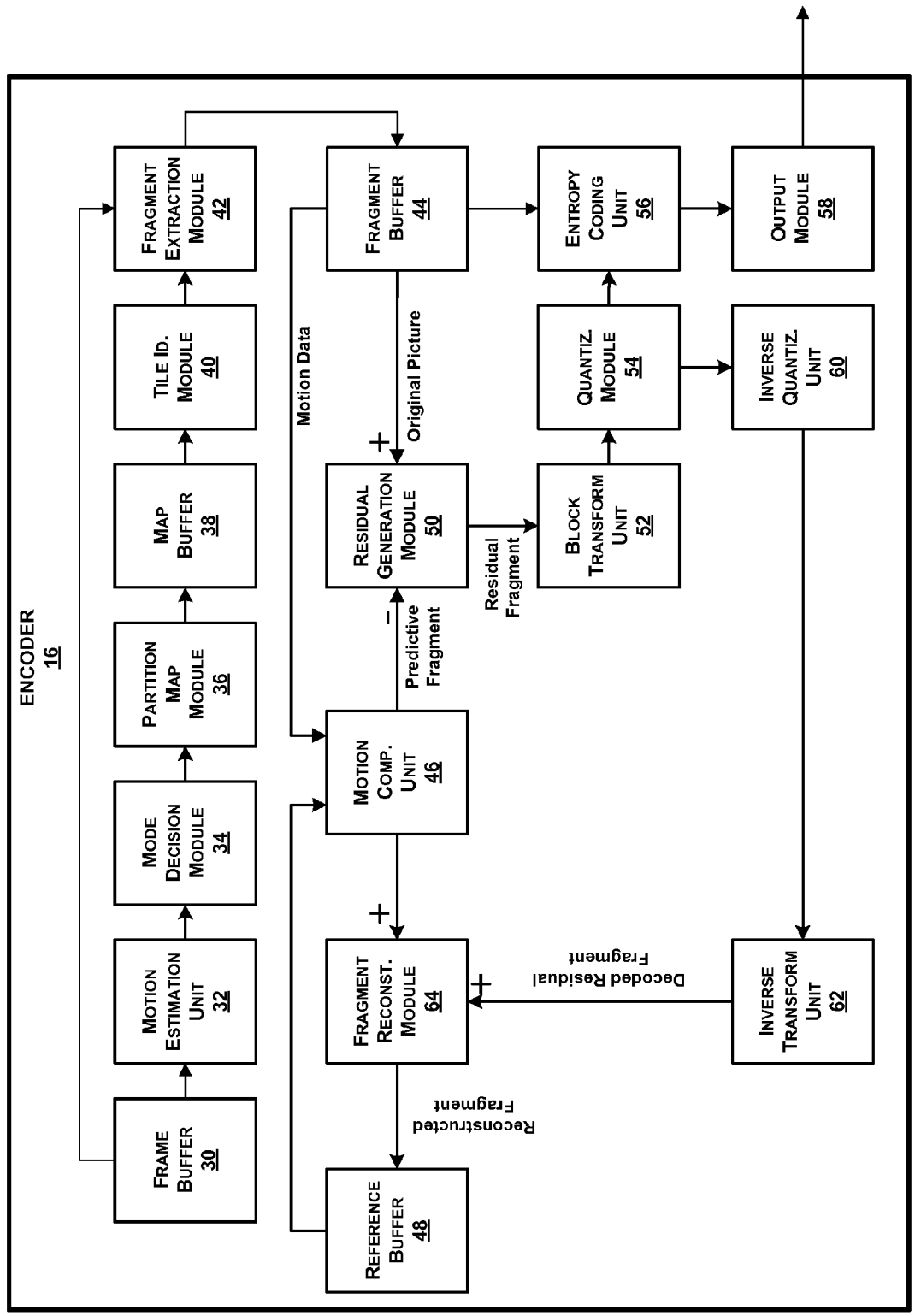
FIG. 2 is a block diagram illustrating exemplary details of the encoder presented in FIG. 1.

FIG. 2 is a block diagram illustrating exemplary details of encoder 16 (FIG. 1). In the example of FIG. 2, pre-processor 10 or another hardware and/or software unit may store a sequence of unencoded video frames in a frame buffer 30 in encoder 16. Frame buffer 30 may be a unit of memory that may be separate from or part of a main memory of encoder 16. This sequence of video frames may include a variable number of video frames. For example, a first sequence of video frames may include five video frames, a second sequence of video frames may include sixteen video frames, and a third sequence of video frames may include three hundred video frames. In another example, a sequence of video frames may form one or more Group Of Pictures ("GOPs").

When a sequence of video frames is stored in frame buffer 30, a motion estimation unit 32 in encoder 16 may generate motion data for each partition in each video frame in the sequence of video frames. As used in this disclosure, a "partition" is a contiguous group of pixels. For example, a partition may be a 16×16 group of pixels. In this example, the term "partition" may be synonymous with the term "macroblock" or "block" used in the parlance of the MPEG and H.26x video coding standards. However, in a more general example, a partition may be a group of pixels in any shape (e.g., triangular, trapezoidal, circular, rectangular, etc.).

The motion data generated by motion estimation unit 32 may vary depending on how a current frame is to be encoded. For instance, if a frame is to be inter-coded as a predictive frame ("P-frame"), motion estimation unit 32 may generate motion vectors for each partition of the frame. Each motion vector generated by motion estimation unit 32 may specify displacement values of one or more partitions from positions in one or more reference frames to a position in the P-frame. For example, a motion vector for a partition may specify one or more reference frames, horizontal displacements of the identified partitions, and vertical displacements of the identified partitions. In this example the reference frames specified in a motion vector of a current frame need not be frames that immediately precede or follow the current frame. For instance, in the H.264 standard, a reference frame may be up to sixteen frames removed from a current frame. If the frame is to be inter-coded as a bi-predictive frame ("B-frame"), motion estimation unit 32 may generate, for each partition of the frame, a set of lists of reference frame index values. During decoding, the lists of frame index values may be used to interpolate a position of the partition in the B-frame. If the frame is to be encoded as an intra-coded frame ("I-frame"), motion estimation unit 32 may not generate motion data or may perform no action with regard to the I-frame.

After motion estimation unit 32 generates motion data for each partition in each video frame in the sequence of video frames, a mode decision module 34 may select a partition encoding mode for each partition. For example, in the H.264/AVC standard, mode decision module 34 may determine on a partition-by-partition basis whether partitions of intra-frames are to be encoded using an Intra_4×4 coding mode or an Intra_16×16 coding mode. Furthermore, in the H.264/AVC standard, mode decision module 34 may determine on a partition-by-partition basis whether partitions of P-frames are to be encoded using a "skip" mode or are to be encoded using motion compensation. In the "skip" mode, the partition is interpreted to store the same pixel data as an equivalently-located partition in a reference frame.

In addition to selecting an encoding mode for each partition in each video frame of the sequence of video frames, mode decision module 34 may perform a "mode smoothing" operation on the partitions. In general, when mode decision module 34 performs a mode smoothing operation, mode decision module 34 reclassifies isolated partitions of a first mode as partitions of a second mode. For example, in a sequence of video frames, a single partition may move across an otherwise static background. In this example, partitions of the static background may be "skip" mode partitions and the moving partition may be encoded according to another mode. A mode smoothing operation may re-classify this partition as a skip mode partition. Frequently such isolated moving partitions are visual noise and may be unnecessary and visually distracting. By performing the mode smoothing operation on the partitions, mode decision module 34 may effectively increase the number of skip mode partitions while at the same time reducing visual noise.

After mode decision module 34 determines a partition encoding mode for each partition, a partition map module 36 in encoder 16 may generate a partition map for each video frame of the sequence of video frames. After generating the partition map for a video frame, partition map module 36 may store the partition map in a map buffer 38. Map buffer 38 may be a separate memory unit, an area within a main memory of encoding device 4 or any suitable memory unit accessible by encoder 16.

A partition map for a video frame may include a data structure for each partition of the video frame. A data structure for a partition of a video frame specifies information about the partition needed to identify tiles. For example, a data structure for a partition may specify an encoding mode for the partition, may specify whether the partition is in an area of uniform motion, and/or other information regarding the partition. In another example, a data structure for a partition may specify luma information of the partition, a chroma palette of the partition (e.g., black-and-white, sepia, etc.), whether the partition is in an area of uniform motion, whether the partition is in an area of accelerating motion, whether the partition is in an area of morphing motion (e.g., zoom in/zoom out), and/or other information regarding the partition.

Figure 3:
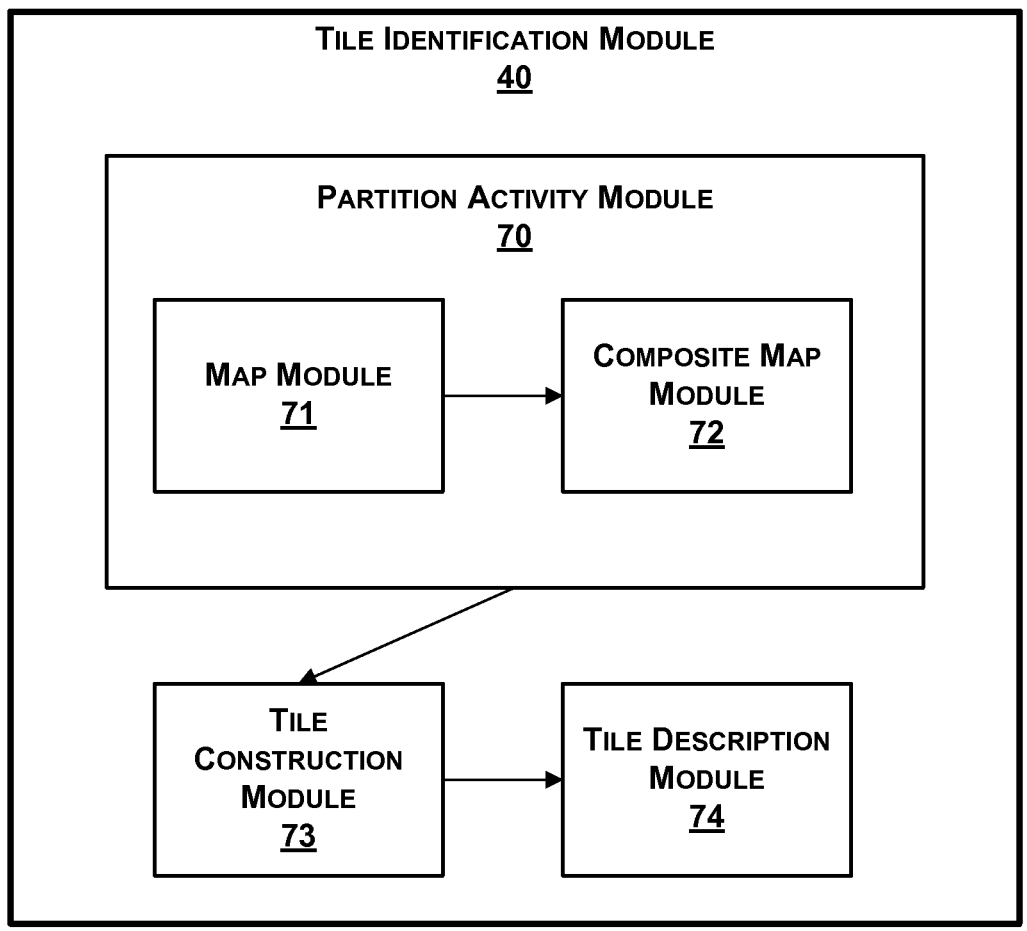
FIG. 3 is a block diagram illustrating exemplary details of the tile identification module presented in FIG. 2.

A tile identification module 40 ("TILE ID. MODULE") in encoder 16 may use the partition maps in map buffer 38 to identify one or more sets of tiles of video frames in the sequence of video frames. Tile identification module 40 may identify the one or more sets of tiles of video frames in a sequence of video frames in a variety of ways. For instance, FIG. 3 provides exemplary details regarding how tile identification module 40 may identify sets of tiles that are co-located. Alternatively, tile identification module 40 may identify sets of tiles of the video frames that overlap but are not strictly co-located. In addition to identifying the sets of tiles, tile identification module 40 may generate tile description information for each of the identified set of tiles. The tile description information for a set of tiles may indicate a tile set index number that may be used to reference the set of tiles, information that indicates a location and shape of the set of tiles, and possibly other attributes.

Next, a fragment extraction module 42 in encoder 16 may extract fragments from the video frames. As used herein, a "fragment" is a picture within a tile of a video frame. For example, if tile identification module 40 identified a rectangular tile of a video frame with a top-left coordinate at pixel (5, 5) of the video frame and a bottom-right coordinate at (10, 10) of the video frame, fragment extraction module 42 may extract from the video frame the set of partitions within the rectangular picture of the frame with a top-left coordinate at (5, 5) and a bottom-right coordinate at (10, 10). This set of partitions is the fragment. In another example, as may be the case with intra-coded video frames ("I-frames"), if tile identification module 40 identifies a rectangular tile of a video frame with a top-left coordinate at pixel (0, 0) of the video frame and a bottom-right coordinate at the bottom-right corner of the video frame, fragment extraction module 42 may extract from the frame the set of partitions that includes all partitions of the frame.

After extracting the fragments and associated motion data, fragment extraction module 42 may store the fragments and the associated motion vectors in a fragment buffer 44. Fragment buffer 44 may be a separate memory unit, an area of a main memory of encoding device 4, or otherwise.

After fragment extraction module 42 extracts a fragment and associated motion data, fragment extraction module 42 may generate picture identification information for the fragment. The fragment identification information of a fragment may indicate an index number of the frame from which fragment extraction module 42 extracted the fragment. In addition, the fragment identification information of a fragment may indicate an index number of a set of tiles associated with the fragment. As described above, the index number of a set of tiles may be indicated by the tile description information of the set of tiles. In this way, the fragment identification information of a fragment identifies the relationship between the fragment and a video frame. For example, the fragment identification information of a fragment may indicate that the fragment was extracted from frame "5" and is associated with a set of tiles "3."

Subsequently, fragment buffer 44 may send a set of motion data associated with the partitions of one of the fragments to a motion compensation unit 46 ("MOTION COMP. UNIT") in encoder 16. For purposes of explanation, this one of the fragments is referred to herein as the "current fragment." When motion compensation unit 46 receives the set of motion data associated with partitions of the current fragment, motion compensation unit 46 may determine whether the current fragment is to be encoded as a P-frame, a B-frame, or as an I-frame.

If the current fragment is being encoded as a P-frame, the motion data associated with the current fragment may specify one or more motion vectors and one or more frame index values for each partition of the current fragment. Motion compensation unit 46 may retrieve from a reference buffer 48 each reference fragment that is associated with the specified frame index values and that is also associated with the tile set index value specified by the fragment identification information of the current fragment.

After retrieving the reference fragments from reference buffer 48, motion compensation unit 46 may, for each partition of the current fragment, use the motion vectors of the partition to identify a partition in one or more of the retrieved reference fragments and then place the identified partition into the partition of the current fragment. For instance, a motion vector for a partition of the current fragment may indicate a partition of one of retrieved reference fragments by specifying a horizontal displacement and a vertical displacement between the partition of the current fragment and the partition of the retrieved reference fragment. In this instance, motion compensation unit 46 may use the pixel data of the indicated fragment of the retrieved reference fragment as the pixel data of the fragment of the current fragment. In this way, motion compensation unit 46 "moves" partitions from the reference fragments into appropriate locations in the predictive fragment associated with the current fragment.

When the current fragment is smaller than the video frame from which it was extracted, the current fragment includes fewer partitions than the video frame. Because the current fragment includes fewer partitions than the video frame, motion compensation unit 46 may perform the motion compensation operation on the current fragment more quickly and efficiently (in terms of computational and hardware complexity) than motion compensation unit 46 would be able to perform the motion compensation operation on the video frame.

If the current fragment is being encoded as a B-frame, the motion data associated with the current fragment may specify two or more lists for each partition of the current fragment. In one exemplary implementation, the first one of the lists for a partition (i.e., List 0) may specify zero or more frame index values of frames that occur before the frame from which the current fragment was extracted. The second one of the lists for the partition (i.e., List 1) may specify zero or more frame index values of frames that occur after the frame from which the current fragment was extracted. Motion compensation unit 46 may retrieve from reference buffer 48 each reference fragment that is associated with the frame index values specified in the two or more lists and that is also associated with the tile set index value of the current fragment. After retrieving the reference fragments from reference buffer 48, motion compensation unit 46 may, for each partition of the current fragment, interpolate the content of the partition.

If the current fragment is to be encoded as an I-frame, motion compensation unit 46 may identify a predictive fragment that is all zeros. Because the predictive fragment is all zeros, when a residual generation module 50 in encoder 16 adds a negative version of the predictive fragment with the current fragment, the resulting residual fragment is the same as the current fragment. In an alternative implementation, motion compensation unit 46 and residual generation module 50 may be by-passed completely when the current fragment is to be encoded as an I-frame. In other words, the current fragment may be provided directly to a block transform unit 52 in encoder 16.

As alluded to in the previous paragraph, after motion compensation unit 46 generates the predictive fragment, residual generation module 50 may generate a residual fragment by adding a negative version of the predictive fragment and the corresponding original fragment stored in fragment buffer 44. More generally, residual generation module 50 may generate a residual fragment that represents the difference between the predictive fragment and the corresponding original fragment. Next, block transform unit 52 may generate a set of coefficients by performing a transformation process on the residual fragment. For instance, block transform unit 52 may generate a matrix of coefficients for each block of pixels in the residual picture by performing a two-dimensional discrete cosine transform on each of the blocks of pixels within the residual fragment. After block transform unit 52 generates the set of coefficients, a quantization module 54 ("QUANTIZ. MODULE") in encoder 16 may generate a set of quantized coefficients by quantizing the coefficients in the set of coefficients. For instance, quantization module 54 may use a quantization matrix to quantize the coefficients in each matrix of coefficients.

An entropy coding unit 106 in encoder 16 may then perform an entropy encoding operation on the set of quantized coefficients. For example, entropy coding unit 106 may perform a context-adaptive variable length coding ("CAVLC") operation on the set of quantized coefficients. Furthermore, entropy coding unit 106 may perform an entropy encoding operation on the set of motion data associated with the current fragment. For example, entropy coding unit 106 may perform an exponential-Golomb coding operation on the motion data associated with the current fragment. As discussed above, if the current fragment is being encoded as a p-frame, the motion data associated with the current fragment may comprise sets of motion vectors of partitions of the current fragment. If the current fragment is being encoded as a b-frame, the motion data associated with the current fragment may comprise flags indicating skip mode partitions, lists of fragment identifiers from which content of the partitions within the current fragment can be interpolated.

After entropy coding unit 106 performs the entropy encoding operation on the set of quantized coefficients and the corresponding motion data, an output module 58 in encoder 16 may output the entropy encoded quantized coefficients and corresponding motion vectors associated with the current fragment. Because fragments of a video frame may not include all of the video frame, output module 58 may output less data than if output module 58 were outputting the complete video frame.

Output module 58 may output tile description information and fragment identification information associated with the current frame. Output module 58 may output the fragment identification information and the tile description information in a variety of ways. In a first example, if output module 58 is outputting the encoded fragments in accordance with the H.264 standard, output module 58 may map each encoded fragment to a different frame in an H.264 stream. Furthermore, in this first example, output module 58 may output supplemental enhancement information ("SEI") that indicates the fragment identification information and the tile description information. In a second example, if output module 58 is outputting the encoded fragments in accordance with the H.264 standard, output module 58 may map the encoded fragments associated with a frame to different slice groups in accordance with the flexible macroblock ordering ("FMO") capability of the H.264 standard. In this second example, mechanisms for describing the locations of the different slice groups are already included in the H.264 standard. In a third example, if compliance to a standard is not critical, as in closed applications where the decoder/receiver and transmitter/encoder are aware of the capabilities of each other, a new syntax/semantics or format can be used to communicate this information and the format can be programmed a priori at the decoder.

Furthermore, when quantization module 54 generates a set of quantized coefficients associated with the current fragment, an inverse quantization unit 60 ("INVERSE QUANTIZ. MODULE") in encoder 16 may generate a set of inverse quantized coefficients associated with the current fragment by performing an inverse quantization operation on the set of quantized coefficients. Inverse quantization unit 60 may perform the inverse quantization operation using an inverse quantization matrix that corresponds to the quantization matrix used by quantization module 54. After inverse quantization unit 60 generates the set of inverse quantized coefficients, an inverse transform unit 62 in encoder 16 may generate a decoded residual picture associated with the current fragment by applying to the set of inverse quantized coefficients an inverse of the transform applied by block transform unit 52. For example, if block transform unit 52 applied a two-dimensional discrete cosine transform, inverse transform unit 62 may apply a two-dimensional inverse discrete cosine transform.

A fragment reconstruction module 64 ("FRAGMENT RECONST. MODULE64") in encoder 16 may generate a reconstructed fragment associated with the current fragment by adding the decoded residual picture associated with the current fragment and the predictive picture associated with the current fragment. While encoder 16 in the example of FIG. 2 uses an adder to generate the reconstructed fragment, it should be appreciated that other types of hardware or software modules may perform the functionality of fragment reconstruction module 64. When fragment reconstruction module 64 generates the reconstructed fragment, fragment reconstruction module 64 may store the reconstructed picture in reference buffer 48 for subsequent use as a reference fragment. Because reference fragments may include fewer bits than complete video frames, reference buffer 48 may be smaller than if reference buffer 48 had to store complete video frames. In addition, because reference fragments may include fewer bits than complete video frames, memory transfer traffic requirements may be reduced. As a result of the lower memory transfer traffic, it may require less time and power to write reference fragments to reference buffer 48. After reference buffer 48 stores the reconstructed picture, motion compensation unit 46 may receive another set of motion data from fragment buffer 44 and this process may occur again with regard to another fragment in fragment buffer 44. Furthermore, this process may continue until all fragments in fragment buffer 44 have been processed.

FIG. 3 is a block diagram illustrating exemplary details of tile identification module 40. In the example of FIG. 3, tile identification module 40 includes a partition activity module 70 that uses the partition maps generated by partition map module 36 to create a composite partition activity map for the video sequence. A partition activity map for a video frame indicates which partitions of the video frame are "active" and which partitions of the frame are "inactive." For instance, a partition activity map may be an array of Boolean values with "true" values indicating active mode partitions and "false" values indicating inactive partitions. A partition of a given video frame is an inactive partition when the motion vector of the partition indicates that the partition has no displacement relative to a partition in a reference frame and when the partition has no residual value vis-à-vis the co-located partition in the reference frame. Conversely, a partition of a given frame is "active" when the motion vector of the partition indicates that the partition has at least some displacement relative to a partition in a reference frame, when the partition has a non-zero residual value vis-à-vis a co-located partition in the reference frame, or when the partition has a non-zero residual value vis-à-vis a co-located partition in the reference frame and has at least some displacement relative to a partition in the reference frame.

In order to generate the composite partition activity map, a map module 71 in partition activity module 70 may generate one or more partition activity maps for a video frame by identifying groups of partitions in the frame that have substantially uniform motion. In order to identify groups of partitions that have substantially uniform motion, map module 71 may apply a moving median filter to the horizontal displacements indicated by components corresponding to the horizontal dimension of motion vectors of the partitions and a moving median filter to the vertical displacements indicated by components corresponding to the vertical dimension of motion vectors of the partitions. The moving median filter effectively removes noise or other non-significant difference among displacements. A moving median filter takes a set of points (e.g., displacement values) and, given a span for the filter, takes a subset of those points centered at x, and returns the median of the subset. For example, suppose that the following values were horizontal or vertical displacement values: 1, 1, 1, 1, 5, 4, 4, 1, 9, 4 and the span of the filter is five. In this example, there could be ten subsets, each having a median value:

| Subset 1: 1 | median = 1; |
|---|---|
| Subset 2: 1, 1 | median = 1; |
| Subset 3: 1, 1, 1 | median = 1; |
| Subset 4: 1, 1, 1, 1 | median = 1; |
| Subset 5: 1, 1, 1, 1, 5 | median = 1; |
| Subset 6: 1, 1, 1, 5, 4 | median = 1; |
| Subset 7: 1, 1, 5, 4, 4 | median = 4; |
| Subset 8: 1, 5, 4, 4, 1 | median = 4; |
| Subset 9: 5, 4, 4, 1, 9 | median = 4; |
| Subset 10: 4, 4, 1, 9, 4 | median = 4. |

In this example, the output of the moving median filter is: 1, 1, 1, 1, 1, 1, 4, 4, 4, 4. Notice how moving median filter removes the "5" and "9" values. After applying the moving median filter, map module 71 may identify groups of consecutive filtered displacement values that have the same value. For instance, map module 71 may identify the group of 1, 1, 1, 1, 1, 1 as a first group of consecutive filtered displacement values and the group of 4, 4, 4, 4 as a second group of consecutive filtered displacement values. Next, map module 71 may denote partitions associated with groups of non-zero filtered displacement values as active partitions. For example, the following table of filtered displacement values illustrates this:

TABLE 1

| 1, 0 | 1, 0 | 0, 0 | 0, 0 | 0, 0 |
|---|---|---|---|---|
| 1, 0 | 1, 0 | 0, 0 | 1, 0 | 0, 0 |
| 0, 0 | 0, 0 | 0, 0 | 0, 0 | 0, 0 |
| 0, 0 | 0, 0 | 0, 0, | 0, −4 | 0, −4 |
| 0, 0 | 0, 0 | 0, 0 | 0, −4 | 0, −4 |

In Table 1, each cell represents a partition, the first number in a cell represents a filtered horizontal displacement value of the partition, and the second number in a cell represents a filtered vertical displacement value of the partition. Using Table 1, map module 71 may denote the four partitions in the upper-left corner as active partitions and the four partitions in the lower-right corner as active partitions. The remaining partitions are inactive partitions because their filtered displacement values are zero.

In another example of how map module 71 may generate a partition activity map, map module 71 may use partition encoding modes rather than motion vector displacement values. To illustrate this, consider Table 2 below:

TABLE 2

| Skip | Skip | Skip | Inter/direct | Inter/direct |
|---|---|---|---|---|
| Skip | Skip | Skip | Inter/direct | Inter/direct |
| Skip | Skip | Skip | Skip | Skip |
| Inter/direct | Inter/direct | Skip | Skip | Skip |
| Inter/direct | Inter/direct | Skip | Skip | Skip |

In Table 2, each cell represents a partition and the word inside a cell indicates the encoding mode used to encode the partition represented by the cell. Using Table 2, map module 71 may denote the four partitions in the top-right as active partitions and the four partitions in the lower-left as active partitions.

Figure 4:
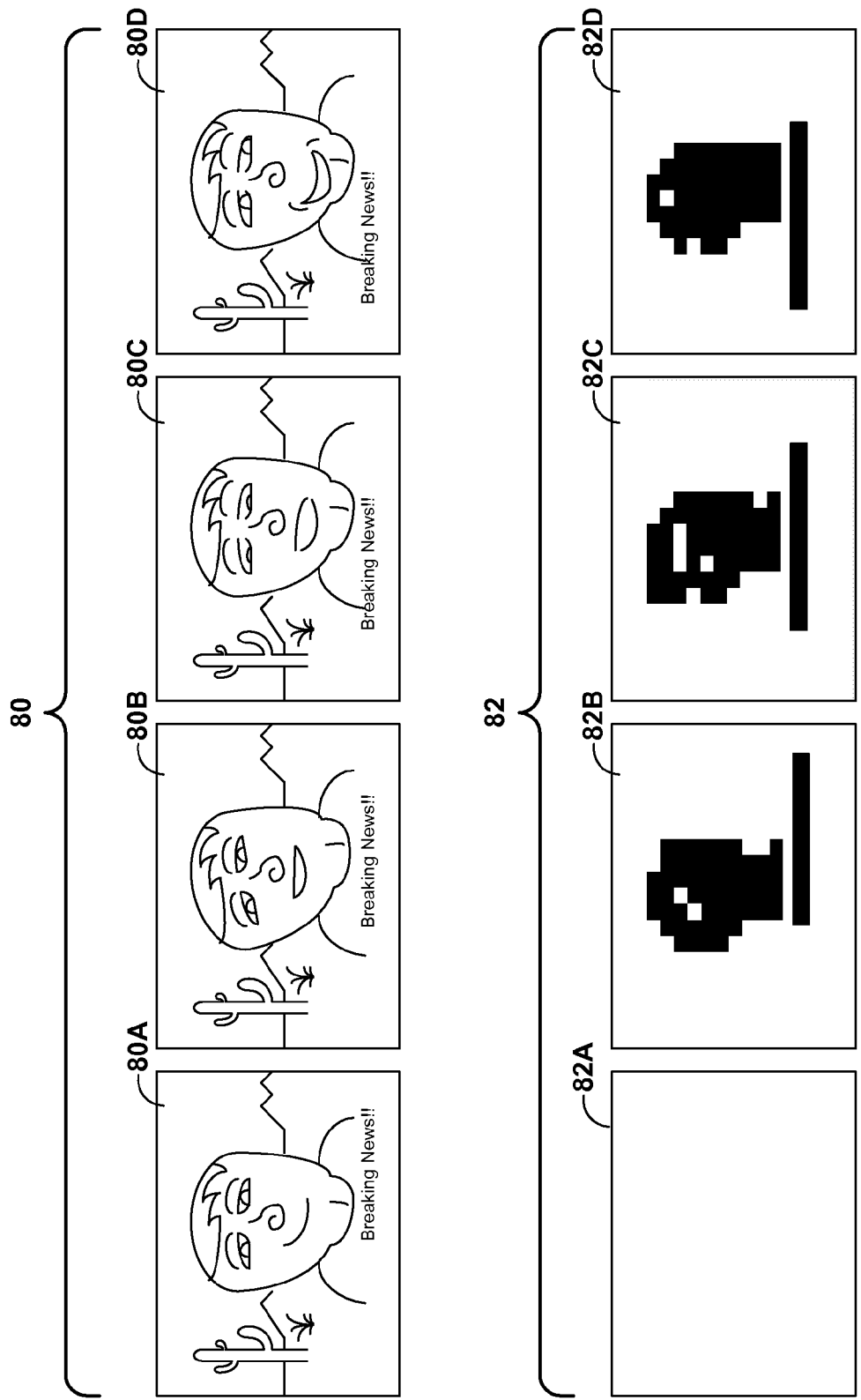
FIG. 4 illustrates an exemplary sequence of video frames and a corresponding set of partition maps that show active partitions as black blocks.

FIG. 4 illustrates an exemplary sequence of video frames 80 and a corresponding set of partition maps 82 that show active partitions as black blocks. As illustrated in the example of FIG. 4, sequence of video frames 80 includes frame 80A, frame 80B, frame 80C, and frame 80D. In the example of FIG. 4, frame 80A is an intra-frame. When tile identification module 40 is identifying tiles for sequence 80, map module 71 may generate a set of partition activity maps 82. The set of partition activity maps 82 includes a map 82A, map 82B, map 82C, and map 82D. Map 82A corresponds to frame 80A, map 82B corresponds to frame 80B, map 82C corresponds to frame 80C, and map 82D corresponds to frame 80D.

Each of video frames 80 is a representation of a man standing in front of a desert background. For instance, the man might be delivering a remote newscast. As is apparent from video frames 80, the desert background does not move or change significantly during video frames 80. Rather, all of the movement and change in video frames 80 is concentrated around the man's head. Because the movement and change in video frames 80 is concentrated around the man's head, the partitions of video frames 80 located in the region around the man's head tend to be active partitions whereas partitions of video frames 80 associated with the background are inactive partitions. Consequently, map 82B, map 82C, and map 82D include black blocks indicating active partitions in the region around the man's head. Map 82A does not include any active mode partitions because frame 80A is an I-frame and I-frames are not constructed with reference to other frames.

Figure 5A:
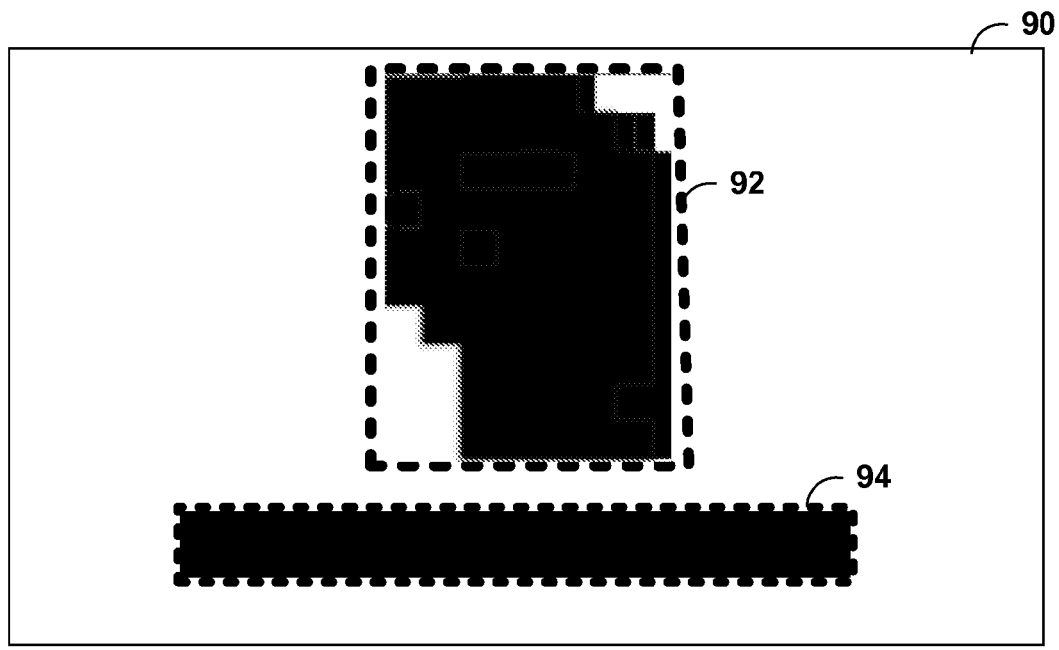
FIGS. 5A, 5B, and 5C illustrate exemplary composite partition activity maps.
Figure 5B:
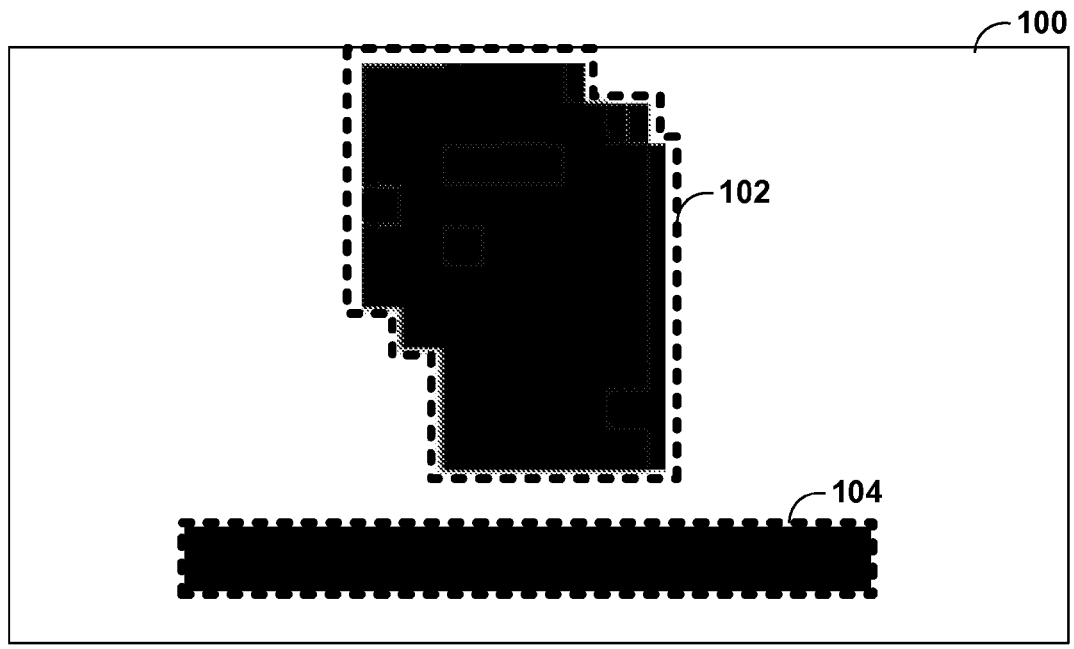
Figure 5C:
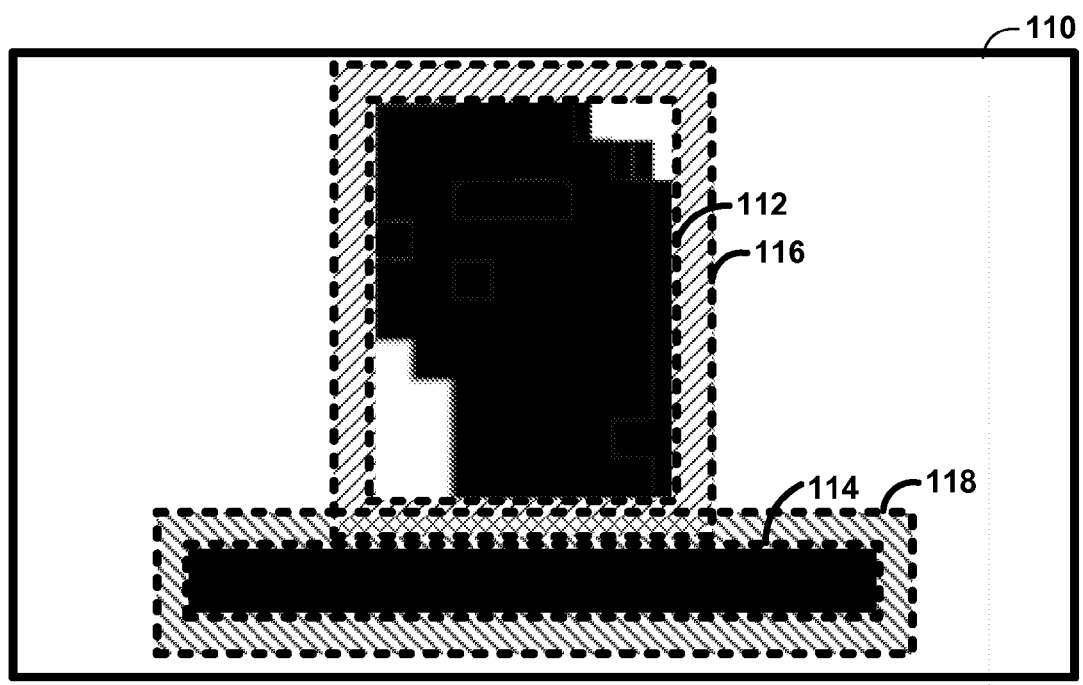

With reference again to FIG. 3, tile identification module 40 may use the partition activity maps to identify one or more sets of tiles of video frames in the sequence of video frames. Tile identification module 40 may use a variety of techniques to identify sets of tiles of video frames in the sequence of video frames. In the example of FIG. 3, partition activity module 70 may include a composite map module 72 that uses the partition activity maps generated by map module 71 to generate a composite partition activity map. As used in this disclosure, a partition activity map is a composite of two or more source partition activity maps if, for every active partition in one of the source partition activity maps, a collocated partition in the partition activity map is an active partition and if, for every inactive partition of the activity map there is no collocated partition of the source partition activity maps that is an active partition. Source partition activity maps may include partition activity maps associated with I-frames, P-frames, B-frames, or otherwise. Composite map module 72 may generate a composite partition activity map by performing logical "or" operations over each of the partition activity maps. In this way, a partition in the composite partition activity map is active when one or more co-located partitions in one or more of the frames are active. FIGS. 5A, 5B, and 5C illustrate exemplary composite partition activity map 90. Composite partition activity map 90 is a composite partition activity map of partition activity maps 82A through 82D (FIG. 4). In other words, composite partition activity map 90 may represent the result of performing a logical "or" operation over partition activity maps 82A through 82D.

After generating composite partition activity map 90, a tile construction module 73 in tile identification module 40 may use composite partition activity map 90 to determine whether the percentage of inactive partitions in composite partition activity map 90 exceeds a given composite partition activity threshold. The composite partition activity threshold may have a variety of different values ranging, for instance, from 20% and higher. If the percentage of inactive partitions in the overall partition activity map does not exceed the composite partition activity threshold, tile construction module 73 may identify a single set of tiles. Each tile in this set of tiles includes the entire area of a video frame in the sequence of video frames. Tile identification module 40 may evaluate whether the percentage of inactive partitions in composite partition activity map 90 exceeds the composite partition activity threshold in order to assess whether it would be more efficient in terms of computational load and/or power consumption to encode the video frames based on tiles or based on whole video frames. In other words, when the percentage of inactive partitions in composite partition activity map 90 is below the composite partition activity threshold, it may be more efficient to encode whole video frames rather than tiles of the video frames.

On the other hand, if the percentage of inactive partitions in composite partition activity map 90 exceeds the threshold, tile construction module 73 may identify one or more tiles of composite partition activity map 90 that include active partitions. The tiles of composite partition activity map 90 may represent distinct areas of uniform motion within the sequence of video frames. As illustrated in the example of FIG. 5A, tile construction module 73 has identified a tile 92 that includes a rectangular area around the upper group of active mode partitions in composite partition activity map 90 and has identified a tile 94 that includes a rectangular area around the lower group of active mode partitions in composite partition activity map 90. Tile 92 corresponds to the active partitions around the man's head in video frames 80 and tile 94 corresponds to the text in video frames 80. The example of FIG. 5B illustrates alternate regions that tile construction module 73 has identified using this same composite partition activity map 90. As illustrated in the example of FIG. 5B, tile construction module 73 has identified a first polygonal tile 102 that includes the upper group of active mode partitions in composite partition activity map 100. In addition, tile construction module 73 has identified a second polygonal tile 104 that includes the lower group of active mode partitions in composite partition activity map 100.

The example of FIG. 5C illustrates additional alternate tiles that tile construction module 73 may identify using composite partition activity map 90. Using composite partition activity map 90, tile construction module 73 has identified a first preliminary tile 112 that includes the upper group of active mode partitions and has identified a second preliminary tile 114 that includes the lower group of active mode partitions. Preliminary tile 112 may or may not be identical to tile 92 in FIG. 5A and preliminary tile 114 may or may not be identical to tile 94 in FIG. 5A. However, in the example of FIG. 5C, tile construction module 73 has also identified a tile 116 that includes partitions that are within preliminary tile 112 and partitions that extend a given number of pixels in each direction from preliminary tile 112. Furthermore, in the example of FIG. 5C, tile construction module 73 has identified a tile 118 that includes partitions that are within preliminary tile 114 and partitions that extend the given number of pixels in each direction from preliminary tile 114. This given number of pixels may be such that all motion vectors of partitions in preliminary tiles 112 and 114 indicate areas that are within tiles 116 and 118, respectively. As illustrated in FIG. 5C, this extra area is illustrated with diagonal lines.

After identifying a tile of a composite partition activity map, tile construction module 73 may identify a tile of each video frame in the sequence of video frames that is co-located with the identified tile of the composite partition activity map. In other words, tile construction module 73 identifies a tile of a video frame such that the tile includes a partition of the video frame if and only if the partition is in a location of the video frame that corresponds to a location of a partition included in the identified tile of the composite partition activity map. In this way, tile construction module 73 identifies a set of co-located tiles of the video frames in the sequence of video frames.

Under some circumstances, it may be advantageous to use tile 116 and tile 118 of FIG. 5C as opposed to tiles 92, 94, 102, and 104 illustrated in the example of FIG. 5A or FIG. 5B. For example, as explained above, motion compensation unit 46 in encoder 16 fetches reference fragments from reference buffer 48. Because reference buffer 48 may be an area of the main memory of encoding device 4, fetching reference pictures from reference buffer 48 may be a time and power consuming process. Furthermore, when motion compensation unit 46 fetches a reference fragment from reference buffer 48, motion compensation unit 46 may store the reference fragment in a memory unit that is local to motion compensation unit 46. Due to the expanded areas of tiles 116 and 118, some partitions are shared between reference fragments. Because some partitions are shared between reference fragments, it may not be necessary for motion compensation unit 46 to fetch those shared partitions twice. Not having to fetch the shared partitions twice may save time and power. A similar situation may apply with regard to a motion compensation unit in decoder 18.

In order to actually identify one or more tiles of a composite partition activity map, tile construction module 73 may perform a variety of different operations. For example, tile construction module 73 may identify connected sets of active partitions in a composite partition activity map by "pruning" away inactive partitions of the composite partition activity map until only active partitions remain. In this example, tile construction module 73 may then identify rectangular tiles (e.g., tiles 92 and 94 in FIG. 5A and tiles 112 and 114 in FIG. 5C) by adding inactive partitions back into the tiles in order to make the tiles rectangular. In another example, tile construction module 73 may identify contiguous sets of active partitions of a composite partition activity map by identifying a first active mode partition of the composite partition activity map and then identifying active mode partitions of the composite partition activity map that neighbor this first active mode partition and then identifying active mode partitions that neighbor these active mode partitions and so on.

Furthermore, tile construction module 73 may identify the tiles of a composite partition activity map in such a way that fragments associated with tiles based on the identified tiles may be fetched from memory in a time and/or power efficient manner. For example, tile construction module 73 may identify a tile of a composite partition activity map such that fragments associated with the tiles based on the tile may be stored entirely within single memory pages. In this example, it may take less time and/or power to retrieve a fragment when the entire fragment is stored within a single memory page. In contrast, complete video frames may be larger than fragments. Because complete video frames may be larger than fragments, it might not be possible to store complete video frames within single memory pages.

When tile construction module 73 identifies a tile of the composite partition activity map, tile construction module 73 may identify tiles of each of the video frames. The identified tiles of the video frames may be co-located with the tile of the composite partition activity map. These identified tiles constitute a set of tiles. Tile construction module 73 may identify such a set of tiles for each connected set of active partitions in the composite partition activity map.

After tile construction module 73 identifies the sets of tiles, a tile description module 74 in tile identification module 40 may create tile description information for each of the identified sets of tiles. The tile description information for a set of tiles may indicate a tile index value that is unique among the identified sets of tiles. Because the tile index value is unique among the identified sets of tiles, the tile index value of a set of tiles may be used to access the tile description information of the set of tiles. Furthermore, the tile description information for a set of tiles may indicate the shape of the tiles in the set of tiles and the position of the tiles in the set of tiles within the video frames. For example, the tile description information of a set of co-located tiles may indicate that the each tile in the set of co-located tiles is rectangular and has a top-left corner at pixel (27, 32) of the video frames and a bottom-right corner at pixel (63, 82) of the video frames. In an alternative example, the tile description information for a set of co-located tiles may list identifiers of partitions of the video frames that are included in the tiles of the set of co-located tiles. Furthermore, if tile in a set of tiles are not co-located, the tile description information of the set of tiles may indicate positions of each of the tiles in the set of tiles.

FIG. 5D illustrates the effect of mode smoothing on a partition activity map 120. As illustrated in the example of FIG. 5D, partition activity map 120 includes a first set of contiguous active partitions 121 and a second set of contiguous active partitions 122. Partitions in set 121 and set 122 may be encoded as "direct mode" partitions, may be encoded as "DC mode" partitions, or may be encoded as another type of non-skip partitions. In addition to set 121 and set 122, partition activity map 120 includes two isolated active partitions 123.

Partition activity map 124 in FIG. 5D is a partition activity map that results from applying mode smoothing to partition activity map 120. As discussed above, mode smoothing may force isolated active partitions to be encoded as skip-mode partitions. Forcing isolated active partitions to be skip-mode partitions may reduce the number of tiles and therefore augment the compression achieved by encoder 16. Notice that partition activity map 124 includes set 121 and set 122. Partition activity map 124 includes set 121 and set 122 because set 122 and set 122 are large enough not to be "smoothed out" (i.e., forced into skip-mode). However, partition activity map 124 does not include isolated active partitions 123.

Figure 6A:
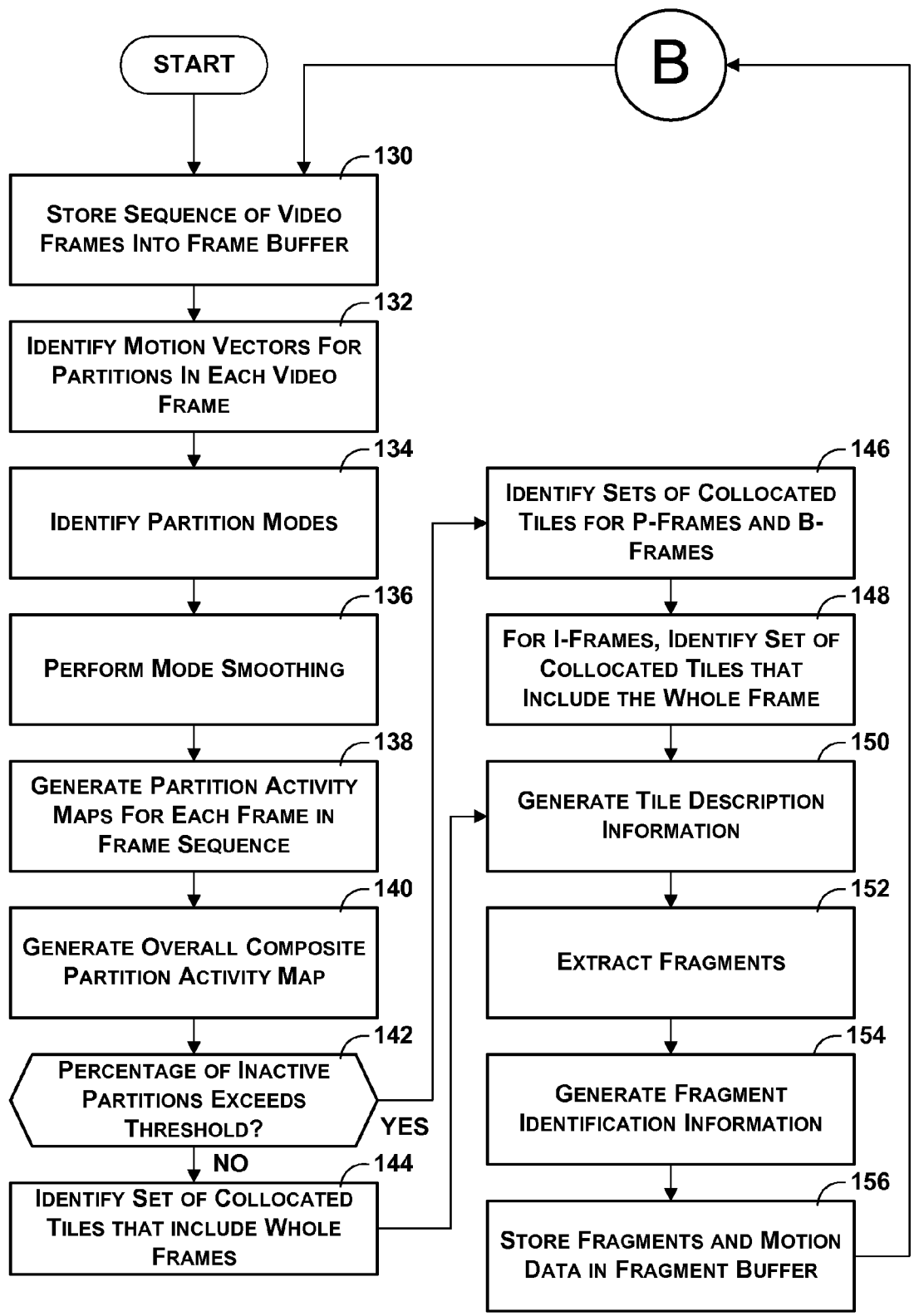
FIGS. 6A and 6B illustrate an exemplary operation of the encoder presented in FIG. 2.
Figure 6B:
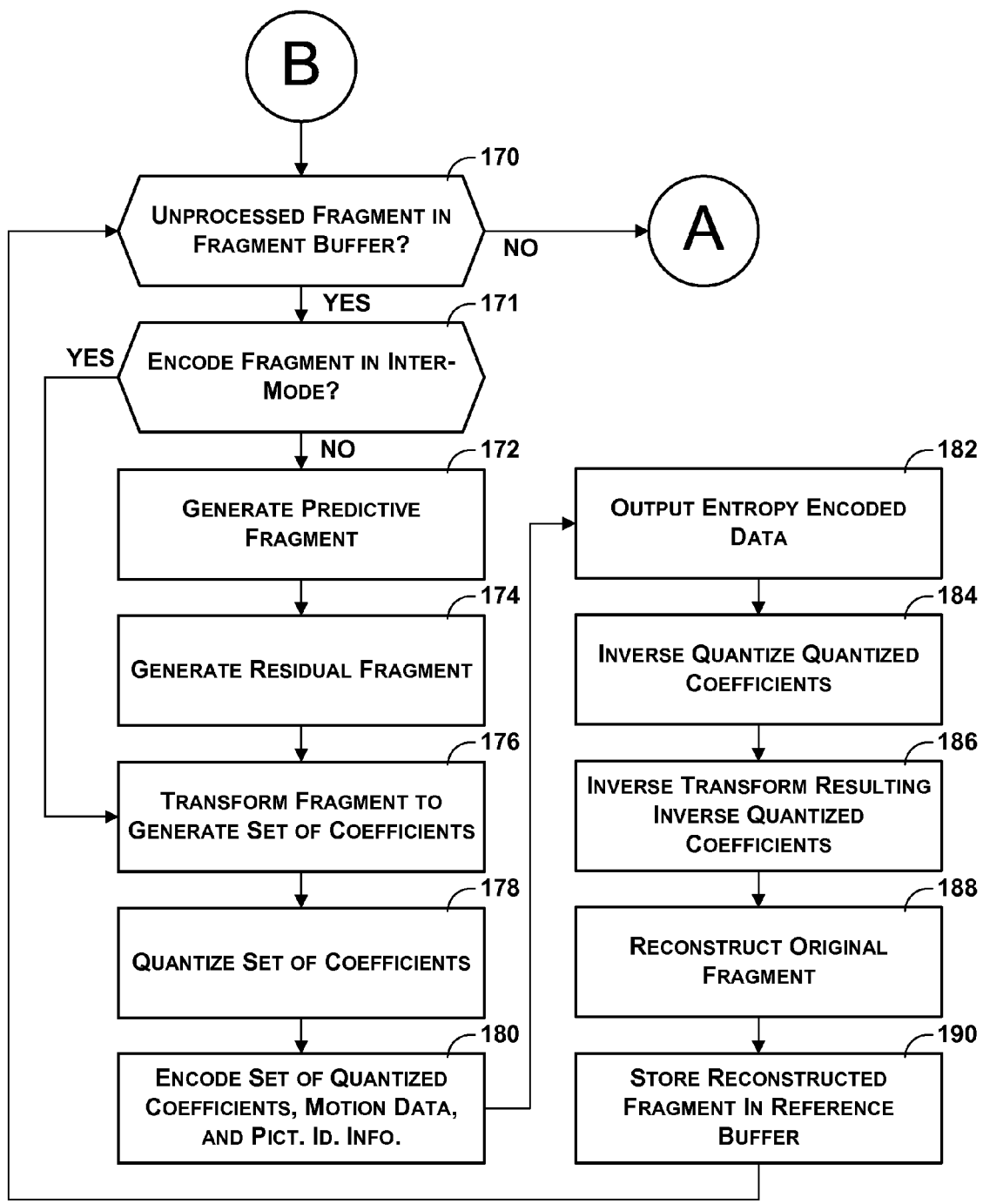

FIGS. 6A and 6B illustrate an exemplary operation of encoder 16 as presented in FIG. 2. In accordance with the exemplary operation illustrated in FIG. 6A, a sequence of unencoded video frames is stored in frame buffer 30 (130). Next, motion estimation unit 32 in encoder 16 may identify motion data for partitions of video frames in the sequence of unencoded video frames (132). After motion estimation unit 32 identifies the motion data for partitions of the video frames in the sequence of unencoded video frames, mode decision module 34 in encoder 16 may identify a partition mode for each partition of each of the video frames in the sequence of video frames (134). In addition, mode decision module 34 may perform a mode smoothing operation on the partitions of each of the video frames in the sequence of video frames (136). As described above with regard to FIG. 5D, mode smoothing may force isolated active partitions to be encoded as skip-mode partitions, thereby reducing the potential number of tiles that tile identification module 40 eventually identifies.

Partition map module 36 may then generate a partition activity map for each video frame in the sequence of video frames (138). As described above, the partition activity maps for the video frames store information that may be used to identify sets of tiles of the video frames. Tile identification module 40 may then use these partition activity maps to generate a composite partition activity map (140). For example, given partition activity maps 32 in FIG. 4, tile identification module 40 may generate composite partition activity maps 90, 100, and 110 as illustrated in FIGS. 5A-5C. Next, tile identification module 40 may determine whether the percentage of inactive partitions in the composite partition activity map exceeds a given threshold (140).

If the percentage of inactive partitions in the composite partition activity map does not exceed the threshold ("NO" of 142), tile identification module 40 may identify a set of tiles of the video frames, wherein each of the tiles includes all partitions of each video frame in the sequence of video frames (144). In an alternative implementation, if the percentage of inactive partitions in the composite partition activity map does not exceed the threshold ("NO" of 142), encoder 16 may perform traditional partition-based encoding.

On the other hand, if the percentage of inactive partitions in the composite partition activity map is greater than or equal to the threshold ("YES" of 142), tile identification module 40 may identify one or more sets of tiles of video frames of the sequence of video frames (146). For example, tile identification module 40 may identify sets of tiles within P-frames and B-frames. Furthermore, in this example, tile identification module 40 may identify a tile in each I-frame that includes all of the I-frame. In another example, tile identification module 40 may identify tiles within an I-frame such that one part of the I-frame could "reference" another part or tile/fragment of the same I-frame. In this way, there could be a few reference tiles identified in the I-frame and the rest of the I-frame could be predicted based on this reference.

After tile identification module 40 identifies the sets of tiles (i.e., after 144 or after 148), tile identification module 40 may generate tile description information for each of the sets of tiles (150). Fragment extraction module 42 may then extract fragments associated with the identified tiles from the video frames (152). In addition, fragment extraction module 42 may generate picture identification information for each of the extracted fragments (154). Fragment extraction module 42 may then store in fragment buffer 44 fragments, motion data associated with the fragments, and the fragment identification information (156).

Next, encoder 16 may perform the operation illustrated in the example of FIG. 6B. Within FIG. 6A, the operation illustrated in the example of FIG. 6B is denoted as "B". After performing the operation illustrated in the example of FIG. 6B, encoder 16 may loop back and store another sequence of video frames into frame buffer 30 (130).

In accordance with the operation illustrated in the example of FIG. 6B, motion compensation unit 46 in encoder 16 may determine whether there is an unprocessed picture in fragment buffer 44 (170). If motion compensation unit 46 determines that there is an unprocessed fragment in fragment buffer 44 ("YES" of 170), motion compensation unit 46 may determine whether the unprocessed fragment in fragment buffer 44 (i.e., the current fragment) is to be encoded in inter-mode or intra-mode (171). If motion compensation unit 46 determines that the current fragment is not to be encoded in inter-mode ("NO" of 171), motion compensation unit 46 may use the reference fragments in reference buffer 48 indicated by the motion data associated with a first unprocessed fragment in fragment buffer 44 (i.e., the current fragment) to identify a predictive fragment associated with the current fragment (172).

Next, residual generation module 50 may generate a residual fragment by adding a negative version of the predictive fragment associated with the current fragment and the original current fragment (174). In this way, the pixel values of the current fragment become residual pixel values. After residual generation module 50 transform the current fragment or after motion compensation unit 46 determines that the current fragment is to be encoded in inter-mode ("YES" of 171), block transform unit 52 may generate a set of coefficients associated with the current fragment by transforming the residual fragment associated with the current fragment (176). Quantization module 54 may then generate a set of quantized coefficients associated with the current fragment by applying a quantization operation to the set of coefficients associated with the current fragment (178).

Subsequently, entropy encoding unit 56 may apply an entropy encoding operation in order to encode the set of quantized coefficients associated with the current picture, the motion data associated with partitions of the current fragment, and picture identification information associated with the current fragment (180). After applying the entropy encoding operation, output module 58 may output the entropy encoded data associated with the current fragment (182). When entropy encoding unit 56 outputs the entropy encoded data associated with the current fragment, entropy encoding unit 56 may also output the tile description information generated by tile identification module 40.

Next, inverse quantization unit 60 may generate a set of inverse quantized coefficients associated with the current fragment by performing an inverse quantization operation on the set of quantized coefficients associated with the current fragment (184). Next, inverse transform unit 62 may generate a decoded residual fragment associated with the current fragment by performing an inverse transform operation on the set of inverse quantized coefficients associated with the current picture (186).

After inverse transform module 110 generates the decoded residual picture, adder 112 may generate a reconstructed fragment associated with the current fragment by adding the decoded residual picture associated with the current fragment with the predictive picture generated by motion compensation unit 46 for the current fragment (188). Reference buffer 48 may then store the reconstructed fragment associated with the current fragment (190).

After reference buffer 48 stores the reconstructed fragment, motion compensation unit 46 may again determine whether there are any unprocessed fragments in fragments buffer 94 (170). If motion compensation unit 46 determines that there are no unprocessed fragments in fragments buffer 94 ("NO" of 170), frame buffer 30 may again receive a sequence of video frames (130) (FIG. 6A).

Figure 7:
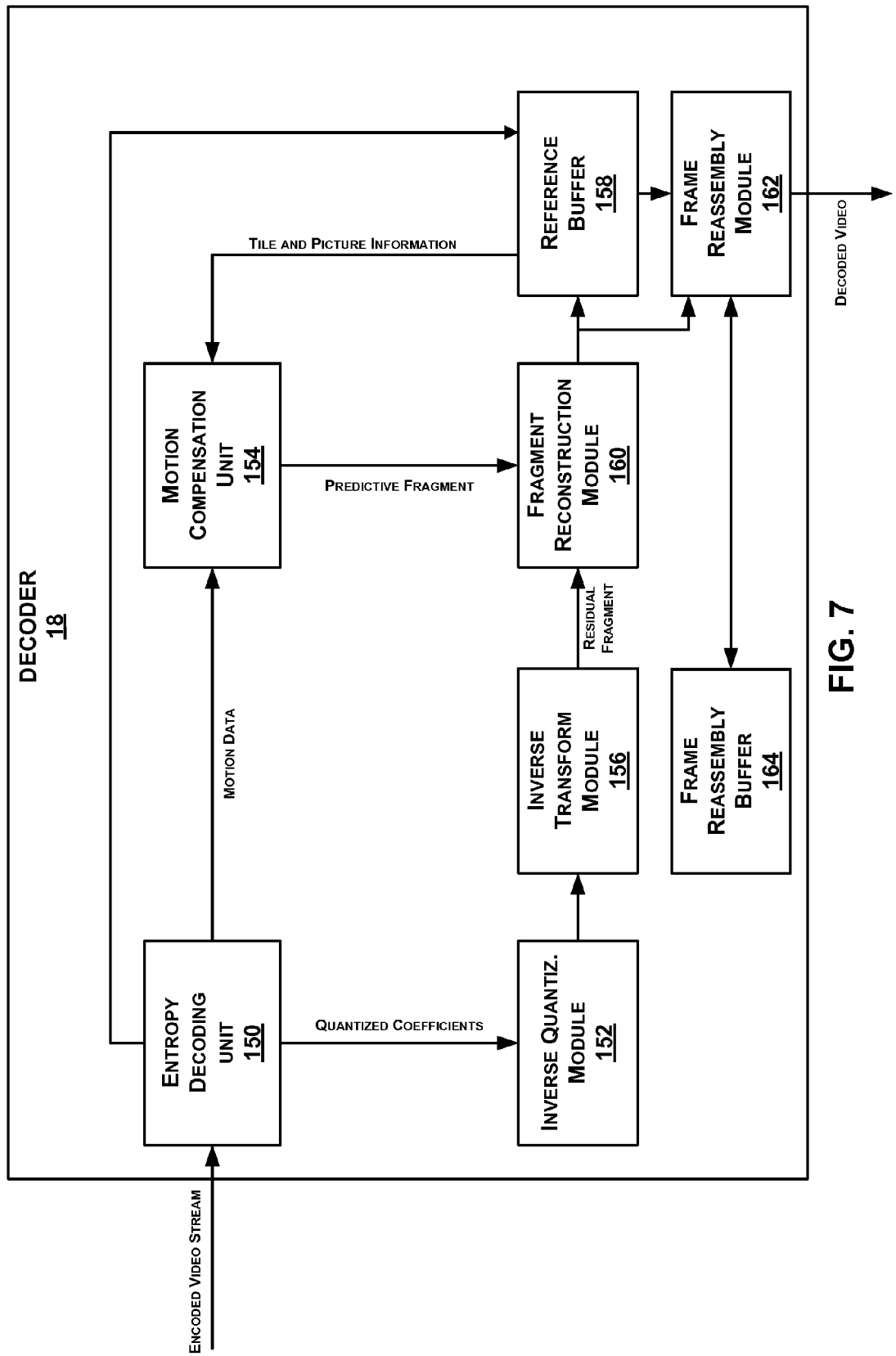
FIG. 7 is a block diagram illustrating exemplary details of the decoder presented in FIG. 1.

FIG. 7 is a block diagram illustrating exemplary details of decoder 18 (FIG. 1). As illustrated in the example of FIG. 7, decoder 18 includes an entropy decoding unit 150. When entropy decoding unit 150 receives a media object that includes an encoded set of quantized coefficients associated with a fragment and motion data associated with partitions of a current fragment, entropy decoding unit 150 decodes the set of quantized coefficients associated with the current fragment and associated motion data by performing an entropy decoding operation on the encoded quantized coefficients and the motion data. Next, entropy decoding unit 150 may provide the decoded quantized coefficients associated with the current fragment to an inverse quantization module 152 in decoder 18 and may provide the decoded motion data associated with the current fragment to a motion compensation unit 154 in decoder 18.

In addition, entropy decoding unit 150 may decode fragment identification information and tile description information. For instance, entropy decoding unit 150 may receive encoded SEI messages that indicate the fragment identification information and the tile description information. As discussed above, the fragment identification information for a picture may indicate a frame associated with the fragment and a set of tiles associated with the fragment. The tile description information for a tile indicates a location of the tile. When entropy decoding unit 150 decodes the fragment identification information and the tile description information, entropy decoding unit 150 may store the decoded fragment identification information and the decoded tile identification information in a reference buffer 158 in decoder 18.

When inverse quantization module 152 receives a set of quantized coefficients associated with the current fragment, inverse quantization module 152 generates a set of inverse quantized coefficients associated with the current fragment by performing an inverse quantization operation on the set of quantized coefficients. Next, an inverse transform module 156 in decoder 18 generates a residual fragment associated with the current fragment by performing an inverse transform operation on the inverse quantized coefficients associated with the current fragment. When motion compensation unit 154 receives a set of motion data associated with the current fragment, motion compensation unit 154 may retrieve from reference buffer 158 reference fragments indicated by motion data in the set of motion data. For example, motion compensation unit 154 may retrieve each fragment in reference buffer 158 that is associated with a frame index number specified by the motion data that is also associated with the tile set index value of the current fragment. Motion compensation unit 154 may then use the retrieved reference fragments to generate a predictive fragment associated with current fragment. Motion compensation unit 154 may generate the predictive fragment using, for example, the techniques described above with regard to motion compensation unit 46. After motion compensation unit 154 generates the predictive picture associated with the current frame and inverse transform module 156 generates the residual picture associated with the current frame, a fragment reconstruction module 160 in decoder 18 generates a reconstructed fragment associated with the current frame by adding the predictive fragment and the residual fragment. While decoder 18 in the example of FIG. 7 uses an adder to generate the reconstructed fragment, it should be appreciated that other types of hardware or software modules may perform the functionality of fragment reconstruction module 160.

After fragment reconstruction module 160 generates the reconstructed fragment, fragment reconstruction module 160 may determine whether the reconstructed fragment is usable as a reference fragment. For example, in one scheme, if the reconstructed fragment was encoded as a B-frame, the reconstructed fragment may not be usable as a reference fragment. If fragment reconstruction module 160 determines that the reconstructed fragment is usable as a reference fragment, fragment reconstruction module 160 may store the reconstructed fragment in reference buffer 158 for subsequent use as a reference fragment. In addition, if fragment reconstruction module 160 determines that the reconstructed fragment is usable as a reference frame, fragment reconstruction module 160 may provide the reconstructed fragment to a frame reassembly module 162 in decoder 18. Otherwise, if fragment reconstruction module 160 determines that the reconstructed fragment is not usable as a reference frame, reconstruction module 160 may provide the reconstructed fragment directly to frame reassembly module 162 without storing the reconstructed frame in reference buffer 158.

Frame reassembly module 162 reassembles complete video frames. In order to reassemble video frames, frame reassembly module 162 may receive a reconstructed fragment from fragment reconstruction module 160. In the context of frame reassembly module 162, the earliest frame that has not yet been outputted by decoder 18 is referred to as the "current frame." When frame reassembly module 162 receives a fragment (i.e., the "current fragment") that is associated with the current frame, frame reassembly module 162 may use the fragment identification information associated with the current fragment to identify a tile associated with the current fragment. Next, frame reassembly module 162 may use the tile description information associated with the identified tile to identify a location of the tile. Frame reassembly module 162 may then copy the current fragment to the identified location of the current frame in a frame reassembly buffer 164. Frame reassembly buffer 164 may store one or more frames in various states of reassembly.

As discussed above, if the current frame is an I-frame, there may be only one fragment associated with the current frame. Furthermore, if the current frame is an I-frame, the fragment associated with the current frame may occupy the entire frame. On the other hand, if the current frame is a P-frame or a B-frame, there may be more than one fragment associated with the current frame. Copying the current fragment to the identified location within the current frame effectively updates the portion of the current frame at the location associated with the identified set of tiles. Copying the current fragment to the identified location within the current frame does not change partitions in frame reassembly buffer 164 that fall outside the identified tile. By copying all fragments associated with a frame into the appropriate locations of the frame, frame reassembly module 162 effectively updates the frame to include all of the information of the current frame.

After frame reassembly module 162 copies the current fragment to the identified location of the current frame, frame reassembly module 162 may determine whether all fragments associated with the current frame have been copied to the current frame. If all fragments associated with the current frame have been copied to the current frame, frame reassembly module 162 may apply a smoothing filter to pixels in the current frame where two or more fragments meet. Applying the smoothing may to these pixels may reduce visual discontinuities between pixels from different fragments. Thus, the smoothing filter may effectively reduce possible appearance of the different fragments as separate blocks. After applying the smoothing filter, frame reassembly module 162 may output the current frame. Otherwise, if not all fragments associated with the current frame have been copied to the current frame, frame reassembly module 162 may receive another reconstructed fragment.

Figure 13:
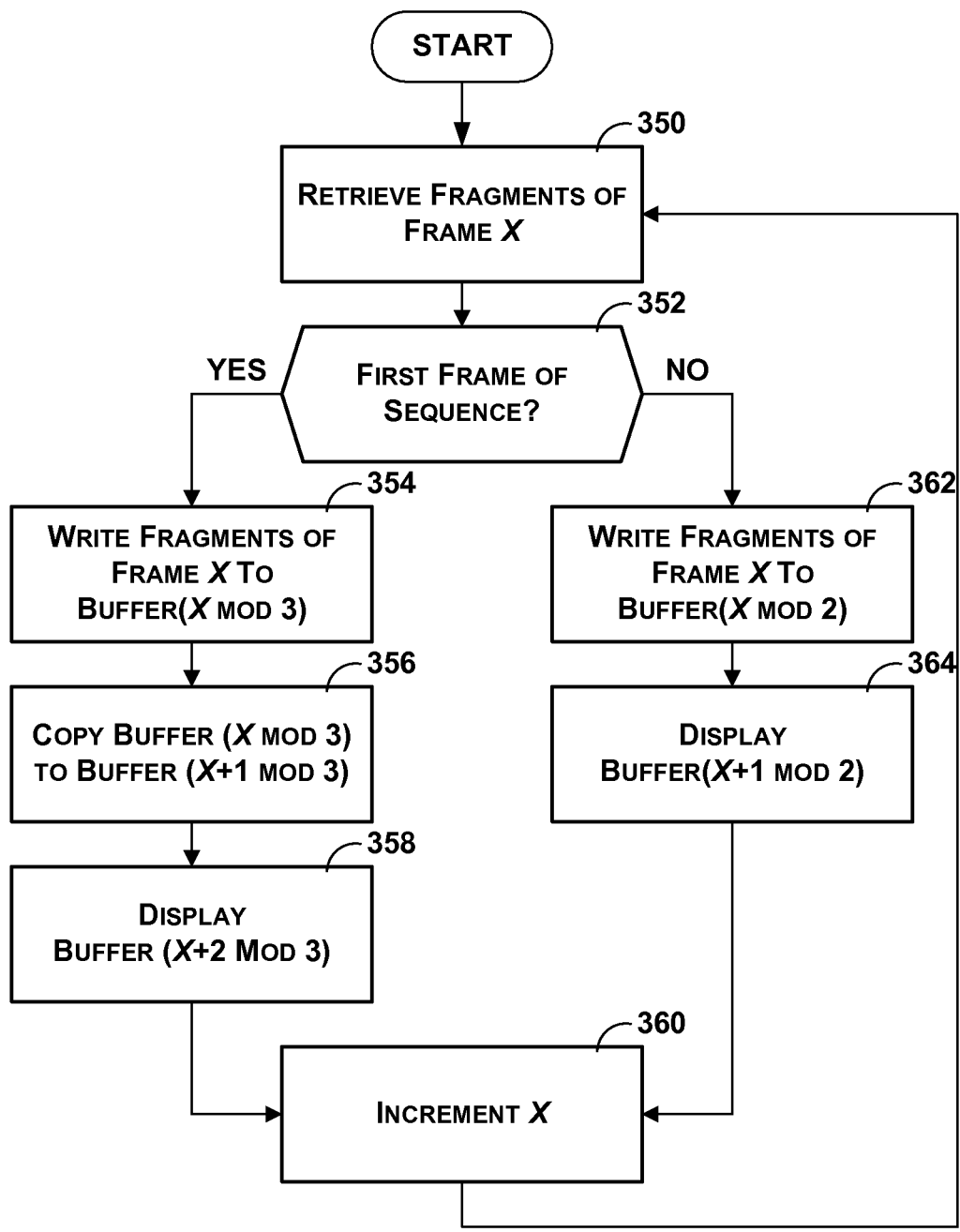
FIG. 13 is a flowchart illustrating an exemplary operation of the buffer fill module to store fragments into the display buffers presented in FIG. 1.

Other implementations of decoder 18 may not include frame reassembly module 162 or frame reassembly buffer 164. In these implementations, post-processor 20 may perform post-processing operations on the fragments stored in reference buffer 158 and not on complete video frames. For instance, post-processor 20 may perform a de-blocking operation on the fragments. Furthermore, in these implementations, post-processor 20 may reassemble the fragments into complete video frames. For example, post-processor 20 may use the fragments to perform a frame-rate up conversion. In a frame-rate up conversion, post-processor 20 may add one or more frames between each existing frame in a sequence of frames, thereby increasing the frame rate of the sequence of frames. In order to add a frame between two or more existing frames, post-processor 20 may perform motion compensation for tiles in frames between existing frames based on the fragments. For instance, post-processor 20 may use the motion vectors of partitions in a fragment of a frame that follows the frame being generated (i.e., the subsequent frame) to identify positions that the partitions would have in a fragment of the frame being generated (i.e., the current frame). A fragment of the current frame may result from performing such motion compensation for all partitions of the fragment of the subsequent frame. Post-processor 20 may then finish the current frame by adding the fragments to the frame that precedes the current frame (i.e., the preceding frame). Furthermore, it should be appreciated that in some circumstances, this frame-rate up conversion technique may be practiced in the context of a traditional encoding and decoding methodology. In these circumstances, post-processor 20 may receive complete decoded video frames from a decoder, identify tiles in video frames, extract fragments based on the tiles, and then perform the frame rate up operation on the fragments to generate additional frames in a sequence of frames. In addition, buffer-fill module 22 may also reassemble fragments into video frames. As described in detail below, FIG. 13 illustrates an exemplary operation that buffer-fill module 22 may use to reassemble the fragments into complete video frames.

Figure 8A:
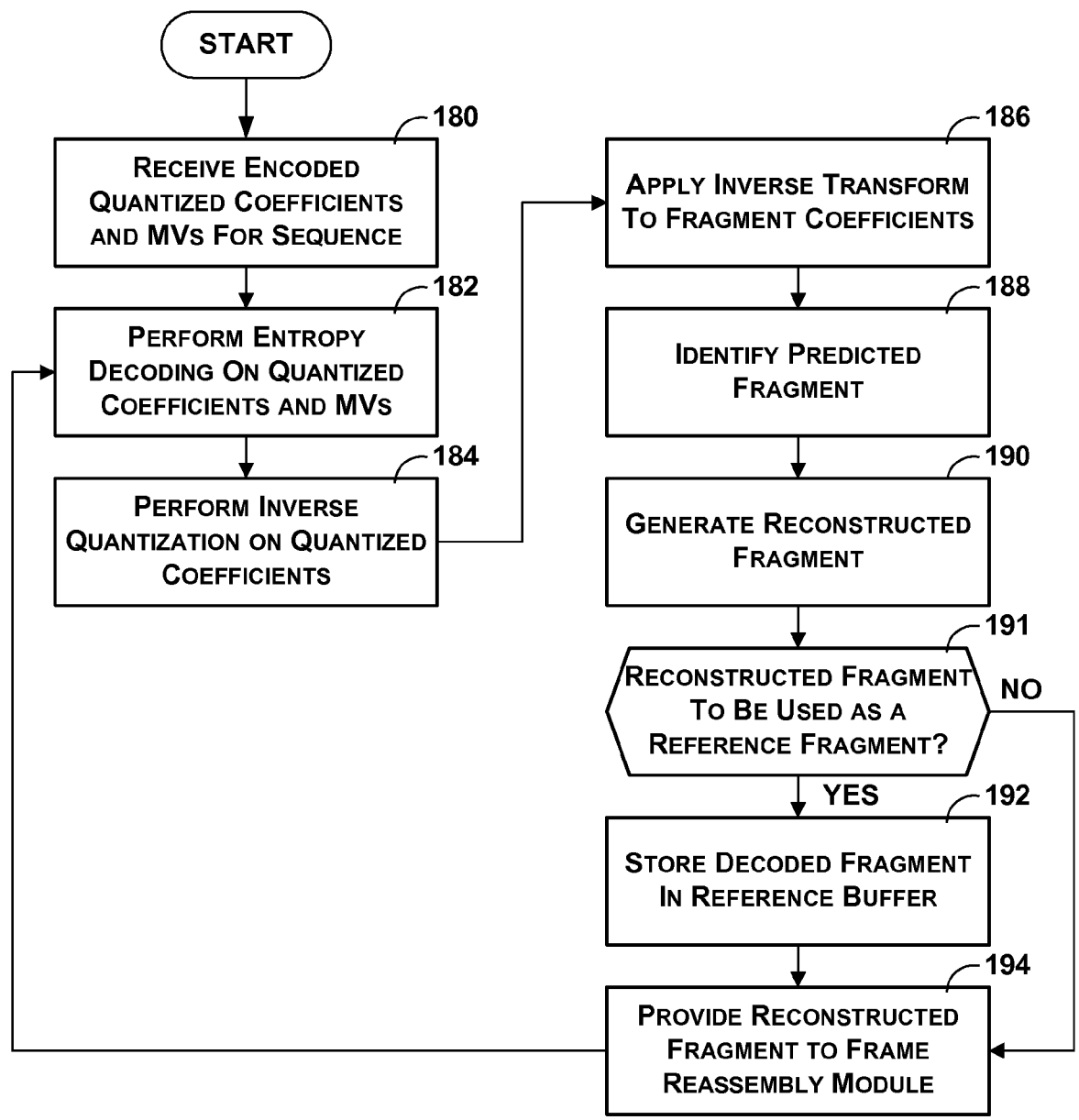
FIGS. 8A and 8B are flowcharts illustrating exemplary operations of modules within the decoder presented in FIG. 7.
Figure 8B:
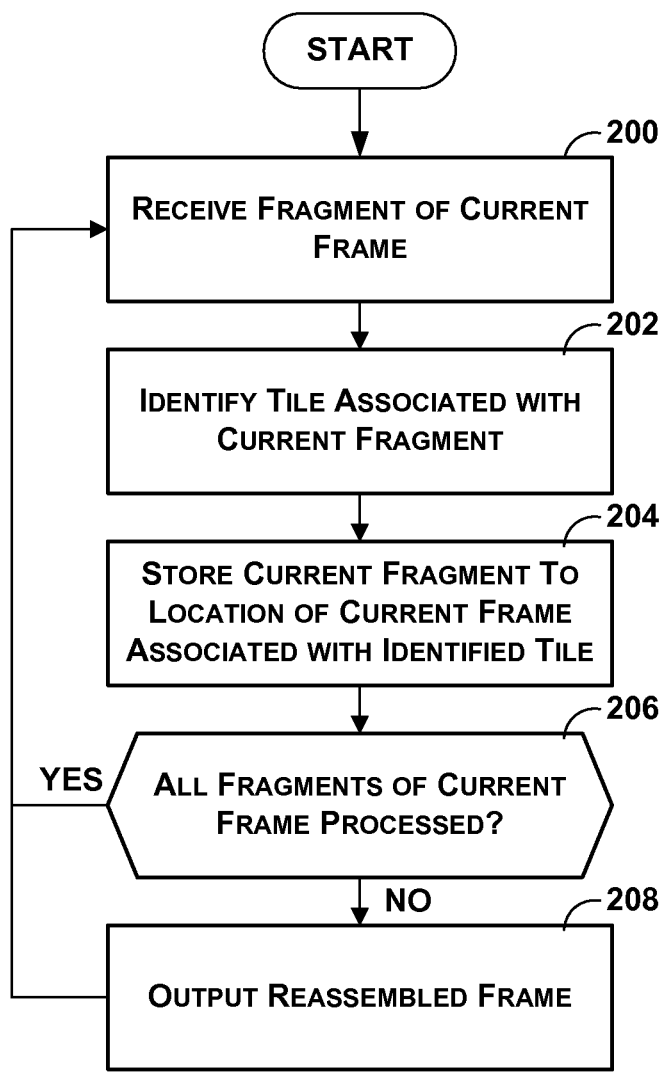

FIGS. 8A and 8B are flowcharts illustrating exemplary operations of modules within decoder 18 (FIG. 7). Initially, in the example operation of FIG. 8A, entropy decoding unit 150 may receive a media object that includes an encoded set of quantized coefficients associated with a current fragment, an encoded set of motion data associated with partitions of the current fragment, fragment identification information, and tile description information (180). After receiving the encoded set of quantized coefficients and the encoded set of motion data, entropy decoding unit 150 may decode the encoded set of quantized coefficients, the encoded set of motion data, the fragment identification information, and the tile description information (182).

Subsequently, inverse quantization module 152 may perform an inverse quantization operation on the decoded set of quantized coefficients associated with the current fragment (184). Performing an inverse quantization operation on the decoded set of quantized coefficients results in an inverse quantized set of coefficients associated with the current fragment. Next, inverse transform module 156 may perform an inverse transform operation on the inverse quantized set of coefficients associated with the current fragment (186). Performing an inverse transform operation on the inverse quantized set of coefficients results in a residual picture associated with the current fragment.

After inverse transform module 156 performs the inverse transform operation or while inverse quantization module 152 is performing the inverse quantization operation or while inverse transform module 156 is performing the inverse transform operation, motion compensation unit 154 uses the decoded set of motion data to identify a predictive fragment associated with the current fragment (188). Next, fragment reconstruction module 160 generates a reconstructed fragment associated with the current fragment by adding the predictive picture associated with the current fragment and the residual picture associated with the current fragment (190). After fragment reconstruction module 160 generates the reconstructed fragment, fragment reconstruction module 160 may determine whether the reconstructed fragment is usable as a reference fragment (191). If fragment reconstruction module 160 determines that the reconstructed fragment is usable as a reference fragment ("YES" of 191), fragment reconstruction module 160 may store the reconstructed fragment into reference buffer 158 (192). After fragment reconstruction module 160 stores the reconstructed fragment into reference buffer 158, fragment reconstruction module 160 may provide the reconstructed fragment to frame reassembly module 162 (194). On the other hand, if fragment reconstruction module 160 determines that the reconstructed fragment is not usable as a reference fragment ("NO" of 191), fragment reconstruction module 160 may provide the reconstructed fragment directly to frame reassembly module 162 (194). After fragment reconstruction module 160 provides the reconstructed fragment to frame reassembly module 162, entropy decoding unit 150 may decode another encoded set of quantized coefficients and another encoded set of motion data (182)

FIG. 8B is a flowchart illustrating an exemplary operation of frame reassembly module 162. Initially, frame reassembly module 162 receives from fragment reconstruction module 160 a fragment associated with a current frame (200). For purposes of explanation, this received fragment is referred to herein as the "current fragment." After receiving the current fragment, frame reassembly module 162 identifies a tile associated with the current fragment (202). After identifying the tile associated with the current fragment, frame reassembly module 162 stores the current fragment to a location in the current frame associated with the identified tile (204). Storing the current fragment to the location in the current frame may effectively "plug" the current fragment into the current frame.

When frame reassembly module 162 has stored the current fragment to the location in the current frame associated with the identified set of tiles, frame reassembly module 162 may determine whether all fragments associated with the current frame have been copied to the current frame (206). If all fragments associated with the current frame have been copied to the current frame ("YES" of 206), frame reassembly buffer 164 may output the current frame (208). After outputting the current frame, frame reassembly module 162 may then loop back and again receive a fragment of the current frame (200). Otherwise, if not every fragment associated with the current frame has been copied to the current frame ("NO" of 206), frame reassembly module 162 may loop back and receive another fragment (200).

Figure 9:
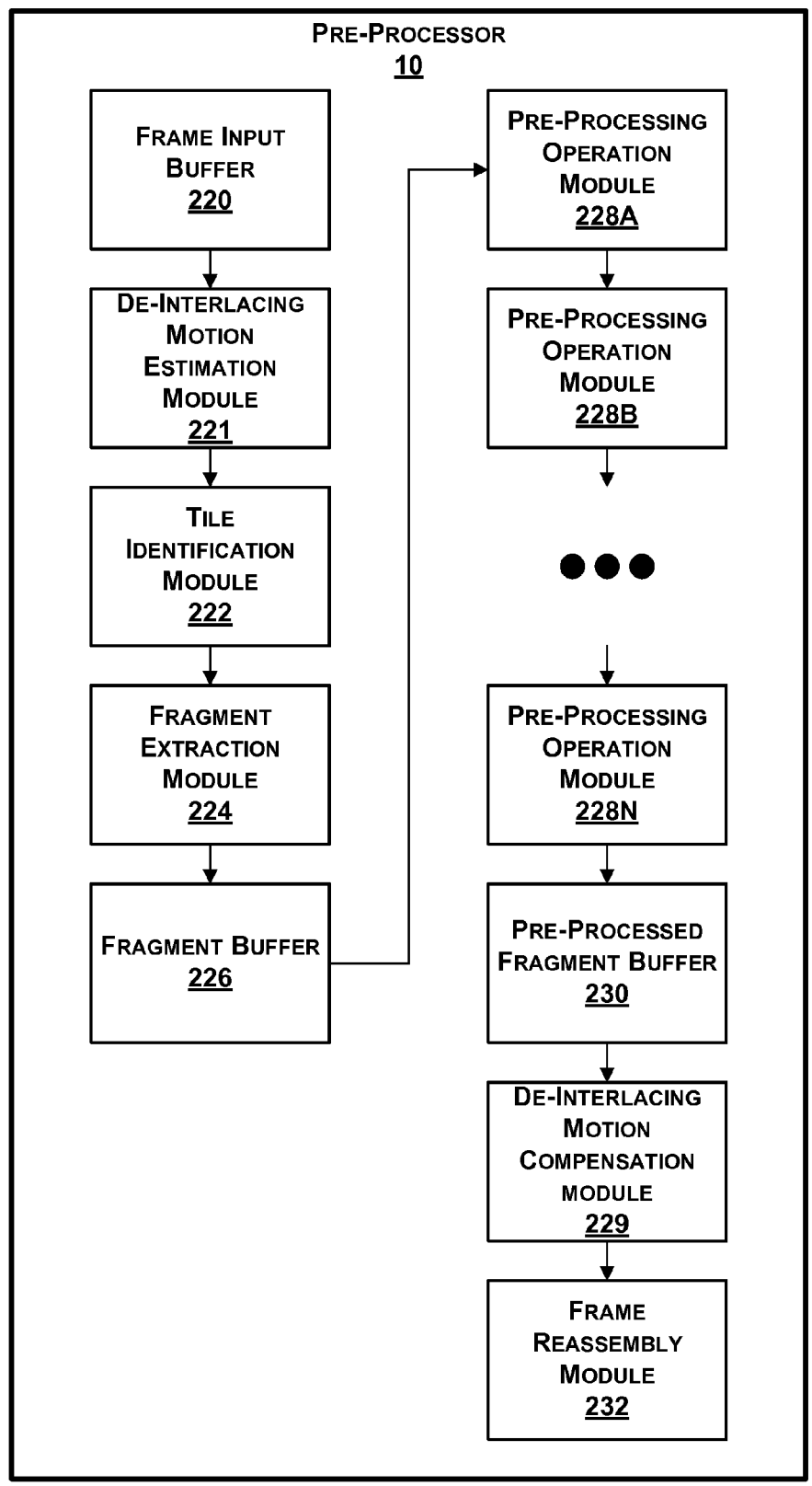
FIG. 9 is a block diagram illustrating exemplary details of the pre-processor presented in FIG. 1.

FIG. 9 is a block diagram illustrating exemplary details of pre-processor 10 (FIG. 1). In the example of FIG. 9, pre-processor 10 includes a frame input buffer 220. Frame input buffer 220 may receive and store one or more unencoded sequences of video frames. Furthermore, pre-processor 10 may include a de-interlacing motion estimation module ("DIMEM") 221. DIMEM 221 may be used as part of a process to de-interface interlaced video frames. For example, even-numbered frames may include video data for even-numbered rows and odd-numbered frames may include video data for odd-numbered rows. In this example, DIMEM 221 may perform a de-interlacing motion estimation operation a de-interlaced for an even-numbered frame by performing the following steps for each block in an odd-numbered interlaced frame that follows the current even-numbered frame:

(1) search for an area of the preceding odd-numbered interlaced frame around a block in the preceding odd-numbered interlaced frame that is with the current block for a block that approximates the current block;

(2) if such a block is found, generate a motion vector that indicates a displacement between the identified block and the current block;

Similarly, in this example, DIMEM 221 may perform a de-interlacing motion estimation operation for a de-interlaced odd-numbered frame by performing the following steps for each block in an even-numbered frame that follows the current odd-numbered frame:

(1) search for an area of the preceding even-numbered frame around a block in the preceding even-numbered frame that is with the current block for a block that approximates the current block;

(2) if such a block is found, generate a motion vector that indicates a displacement between the identified block and the current block.

A tile identification module 222 in pre-processor 10 may use the motion vectors generated by DIMEM 221 to identify sets of tiles for video frames in the sequence of video frames stored in frame input buffer 220. Like tile identification module 190, tile identification module 222 may use a variety of techniques to identify sets of tiles for video frames in a sequence of video frames. For example, tile identification module 222 may generate a partition activity map for each video frame in a sequence of video frames. In this example, tile identification module 222 may then use the partition activity maps to generate a composite partition activity map. Tile identification module 222 may then use the composite partition activity map to identify one or more sets of tiles for each of the video frames that is to be encoded as a p-frame or a b-frame. Tile identification module 222 may use the composite partition activity map to identify the one or more sets of tiles in a manner that is similar to that of tile identification module 190. When tile identification module 222 identifies a set of tiles, tile identification module 222 may generate tile description information for the set of tiles. The tile description information may indicate a tile set index value, a location of the set of tiles within the frames, and a shape of the tiles.

After tile identification module 222 identifies the sets of tiles for frames and generates the associated tile description information, a fragment extraction module 224 in pre-processor 10 may extract, from each frames, fragments associated with the identified tiles. When fragment extraction module 224 extracts a fragment associated with a tile in one of the identified sets of tiles, fragment extraction module 224 may generate fragment identification information for the fragment. The fragment identification information for the fragment may specify a frame number from which the fragment was extracted and a tile set index value associated with the set of tiles of which the tile associated with the fragment is a member. Fragment extraction module 224 may then store the extracted fragments and tile identification information into a fragment buffer 226.

After fragment extraction module 224 stores the extracted fragments into fragment buffer 226, a series of pre-processing operation modules 228A through 228N (collectively, "pre-processing operation modules 228") may perform video pre-processing operations on the extracted fragments. For example, pre-processing operation module 228A may perform a contrast adjustment operation, pre-processing operation module 228B may perform a noise reduction operation, and other ones of pre-processing operation modules 228 may perform other video pre-processing operations. After a last one of pre-processing operation modules 228 performs a last video pre-processing operation on a fragment, this last one of pre-processing operation modules 228 may store the resulting fragment into a pre-processed fragment buffer 230 along with the fragment identification information associated with the resulting fragment.

After the last one of pre-processing operation modules 228 stores the resulting fragment into pre-processed fragment buffer 230, a de-interlacing motion compensation module (DIMCM) 229 may perform operations to de-interlace the fragments. For instance, if the resulting fragment is associated with an even-numbered frame, DIMCM 229 may perform the following steps on each partition of the fragment in order to generate a de-interlaced fragment associated with an even-numbered frame:

(1) use the motion vector of the current partition to identify a partition of a fragment stored in pre-processed fragment buffer 230;
(2) determine a half-way point along the motion vector of the current partition;
(3) add the partition identified by the motion vector of the current partition to the current even-numbered fragment at a position on an odd-numbered line closest to the identified half-way point; and
(4) if the current partition has no motion vector, copy the current partition to an odd-numbered line of the current even-numbered frame at the current partition's current position.

Similarly, if the resulting fragment is associated with an odd-numbered frame, DIMCM 229 may perform the following steps on each partition of the fragment in order to generate a de-interlaced fragment associated with the odd-numbered frame:

(1) use the motion vector of the current partition to identify a partition of a fragment stored in pre-processed fragment buffer 230;
(2) determine a half-way point along the motion vector associated with the current partition;
(3) add the partition indicated by the motion vector associated with the current partition to the current odd-numbered frame at the half-way point at a position on an even-numbered line closest to the identified half-way point; and
(4) if the current partition has no motion vector, copy the current partition to an even-numbered line of the current fragment at the current fragment's current position.

It should be appreciated that many variations on these steps are possible. At the end of this process, DIMCM 229 has generated a set of de-interlaced fragments.

As illustrated in the example of FIG. 9, pre-processor 10 may also include a frame reassembly module 232. Frame reassembly module 232 reassembles the de-interlaced fragments in pre-processed picture buffer 230 into complete de-interlaced video frames. Frame reassembly module 232 may reassemble fragments in pre-processed picture buffer 230 using an operation that is identical or similar to the exemplary operation of frame reassembly module 162 illustrated in FIG. 8B. After frame reassembly module 232 reassembles de-interlaced fragments in pre-processed picture buffer 230 into complete de-interlaced video frames/slices, frame reassembly module 232 may output the complete de-interlaced video frames/slices to encoder 16.

In some implementations, pre-processor 10 does not include frame reassembly module 232. Rather, when DIMCM 229 generates a de-interlaced fragment, DIMCM 229 may output the resulting fragment and associated fragment identification information and tile identification information directly to encoder 16. Furthermore, in these implementations, encoder 16 might not include partition map module 36, map buffer 38, tile identification module 40 or fragment extraction module 42. In these implementations, encoder 16 may operate as a conventional encoder, encoding each fragment provided by pre-processor 10 as a separate conventional video frame. However, in these implementations, when output module 58 outputs encoded data associated with one of the fragments, output module 58 may output the fragment identification information generated by pre-processor 10 for the one of the fragments. Furthermore, output module 58 may output the tile description information generated by pre-processor 10.

Figure 10:
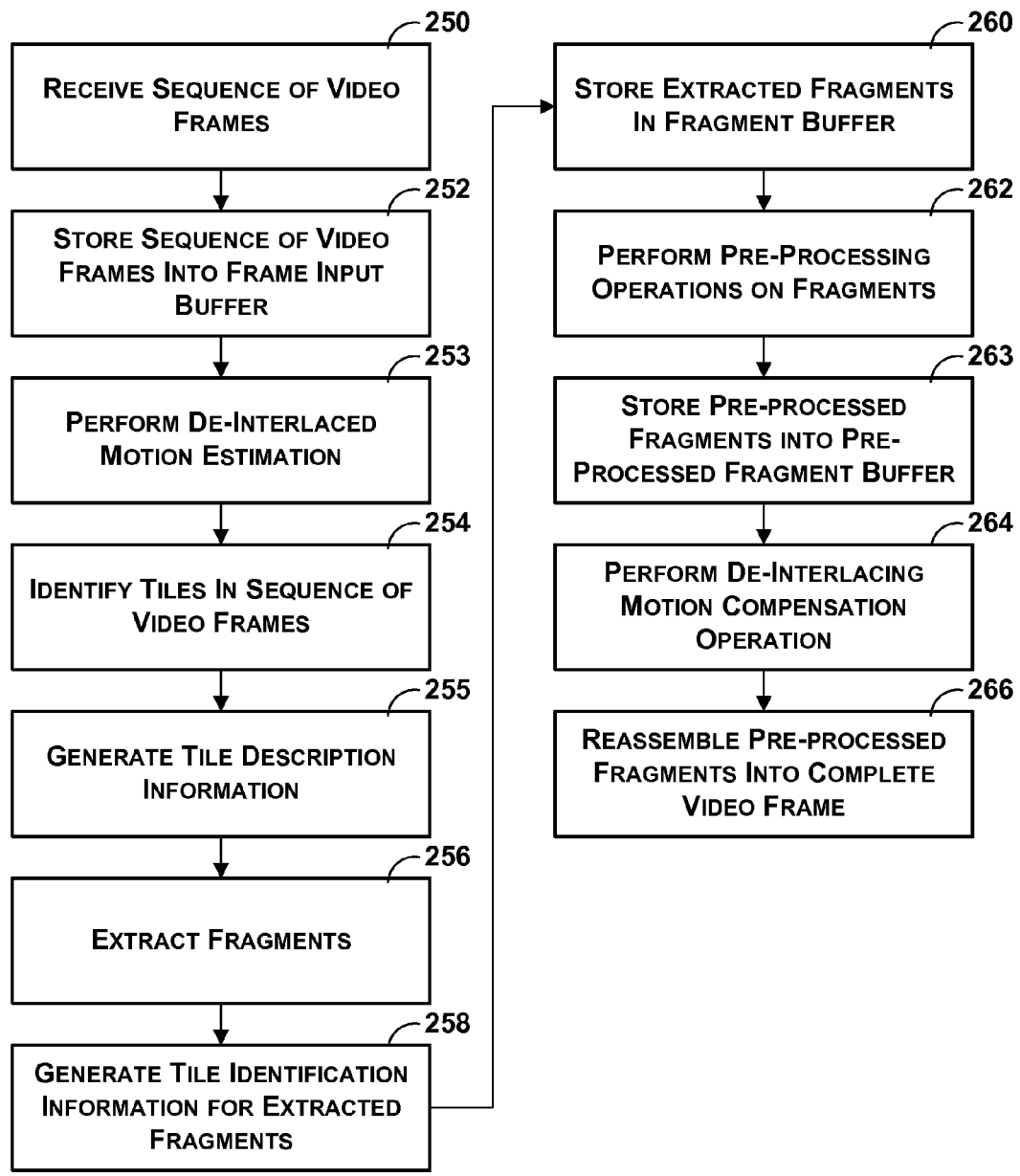
FIG. 10 is a flowchart illustrating an exemplary operation of the pre-processor presented in FIG. 9.

FIG. 10 is a flowchart illustrating an exemplary operation of pre-processor 10 (FIG. 9). Initially, pre-processor 10 receives a sequence of video frames (250). When pre-processor 10 receives a sequence of interlaced video frames, pre-processor 10 may store the sequence of interlaced video frames into frame input buffer 220 (252). Next, DIMEM 221 may perform a de-interlacing motion estimation operation (253). When DIMEM 221 performs the de-interlacing motion estimation operation, DIMEM 221 may generate motion vectors. Tile identification module 222 may use the motion vectors to identify sets of tiles for video frames in the sequence of video frames (254). After tile identification module 222 identifies sets of tiles for the sequence of video frames, tile identification module 222 may generate tile description information for each of the sets of tiles (255).

Next, fragment extraction module 224 may extract, from each video frame in the sequence of video frames, fragments associated with the identified tiles (256). After extracting the fragments, fragment extraction module 224 may generate fragment identification information for each of the extracted fragments (258). Fragment extraction module 224 may then store the extracted fragments into fragment buffer 226 (260).

After fragment extraction module 224 stores the extracted fragments into fragment buffer 226, pre-processing operation modules 228 perform one or more pre-processing operations on the fragments (262). A last one of pre-processing operation module 228 may then store resulting pre-processed fragments into pre-processed fragment buffer 230 (263). Next, DIMCM 229 may perform a de-interlacing motion compensation operation for tiles of a current video frame based on reference fragments stored in pre-processed fragment buffer 230 (264). As a result of the de-interlacing motion compensation operation, fragments produced by DIMCM 229 are de-interlaced. Frame reassembly module 232 may then reassemble the de-interlaced pre-processed fragments in pre-processed picture buffer 230 into complete video frames/slices (266). It should be understood that in some implementations, step 266 may be omitted.

Figure 11:
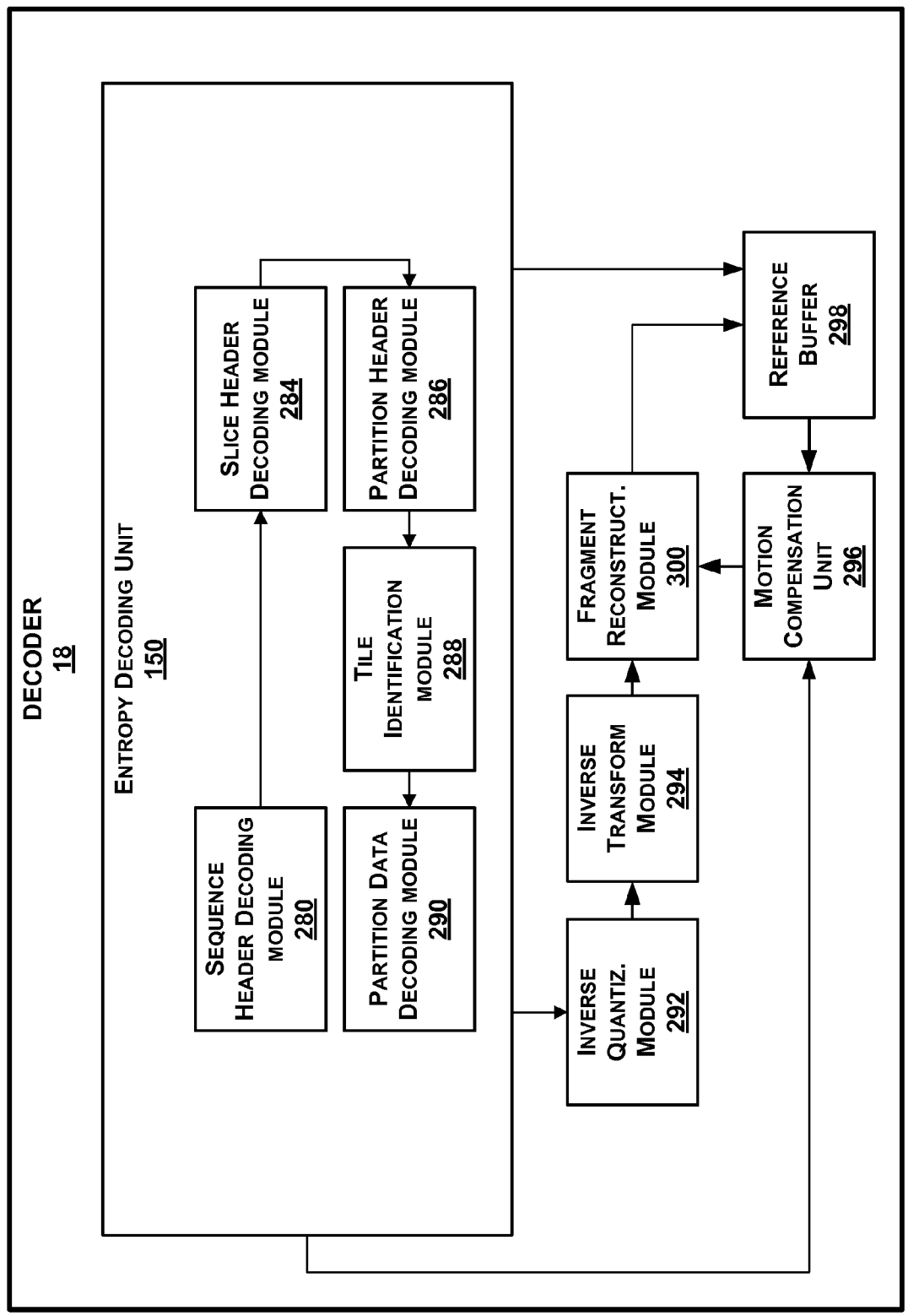
FIG. 11 is a block diagram illustrating an alternate set of exemplary details of the decoder presented in FIG. 1.

FIG. 11 is a block diagram illustrating an alternate set of exemplary details of decoder 18 (FIG. 1). In the example of FIG. 11, decoder 18 receives a media object that includes complete video frames. For instance, decoder 18 may receive a media stream or a media file that includes traditionally-encoded H.264/AVC data, MPEG-4, or another media coding standard. Because the exemplary details of encoder 16 illustrated in FIG. 2 outputs media objects that include fragments of video frames, the exemplary details of decoder 18 illustrated in FIG. 11 may not be compatible with the exemplary details of encoder 16 illustrated in FIG. 2.

In the example of FIG. 11, when decoder 18 receives the media object, entropy decoding unit 150 may perform one or more operations to identify portions of the media object that are associated with one or more sets of tiles of video frames encoded in the media object. After identifying these portions of the media object, entropy decoding unit 150 may decode the identified portions of the media object. In this way, entropy decoding unit 150 may decode sets of fragments and motion data associated with the fragments, while leaving the remaining portions of the video frames and motion data encoded.

Depending on the encoding format of the received media object and possibly other factors, entropy decoding unit 150 may perform these operations in a variety of ways. For example, a media object may include encoded sequence headers that indicate general information about the media object (e.g., frame rate, sizes of frames, etc.). Furthermore, in this example, the media object may include encoded slice headers that indicate information about specific slices of video data (e.g., location of slices, number of partitions in the slice, etc.). The media object may also include encoded partition headers that indicate information about specific partitions (e.g., motion data, number of bits of data in encoded set of quantized coefficients associated with the partition, etc.). As illustrated in the example of FIG. 11, entropy decoding unit 150 may include a sequence header decoding module 280. Sequence header decoding module 280 performs an entropy decoding operation on sequence headers in the media object. Next, a slice header decoding module 284 uses one or more of the decoded sequence headers to identify parts of the media object that represent encoded slice headers. After identifying the parts of the media object that represent encoded slice headers, slice header decoding module 284 performs the entropy decoding operation on the encoded slice headers of the input media object. A partition header decoding module 286 uses the decoded slice headers to identify parts of the media object that represent encoded partition headers. After identifying the parts of the media object that represent encoded partition headers, partition header decoding module 286 performs the entropy decoding operation on the encoded partition headers of the input media stream.

Continuing the example of the previous paragraph, a tile identification module 288 in entropy decoding unit 150 may then use the decoded partition headers to identify encoded partitions of the encoded video frames that are associated with tiles. For instance, tile identification module 288 may use the motion data indicated in the partition headers to generate a partition activity maps for video frames in a sequence of video frames in the media object. Tile identification module 288 may then use the partition activity maps to generate a composite partition activity map. Tile identification module 288 may then, in the manner described above with regard to tile identification modules 90 and tile identification module 222, use the composite partition activity map to identify one or more sets of tiles of video frames in the sequence of video frames that are to be decoded as P-frames or B-frames. After tile identification module 288 identifies a set of tiles, tile identification module 288 may generate tile description information for the set of tiles. Like the previously mentioned tile description information, the tile description information generated by tile identification module 288 may indicate a tile set index value, locations of the tiles, and so on.

When tile identification module 288 has identified the one or more sets of tiles, a partition data decoding module 290 may, for each frame, apply the entropy decoding operation to each encoded partition that is within a tile of one of the identified sets of tiles. In this example, partition decoding module 290 does not apply the entropy decoding operation to encoded partitions that are not within tiles. In this way, partition data decoding module 290 decodes a set of quantized coefficients for each tile in each frame. Because a "fragment" is a picture contained within a tile, partition data decoding module 290, in effect, decodes sets of quantized coefficients that are associated with different fragments. After partition data decoding module 290 decodes a set of quantized coefficients associated with a fragment, partition decoding module 290 generates a set of fragment identification information for the fragment. Like the previously mentioned fragment identification information, the fragment identification information generated by partition data decoding module 290 may indicate a frame index value that indicates that the fragment was extracted from the indicated frame and a tile set index value that indicates that the fragment is a picture contained within a tile in a specific set of tiles.

In the example of FIG. 11, an inverse quantization module 292 may generate a set of inverse quantized coefficients by performing an inverse quantization operation on a set of quantized coefficients associated with a current fragment. Next, an inverse transform module 294 may generate a decoded residual picture associated with the current fragment by performing an inverse transform operation on the set of inverse quantized coefficients associated with the current fragment. In addition, a motion compensation unit 296 may generate a predictive fragment associated with current fragment using a reference fragment in a reference buffer 298 and motion data associated with the current fragment. After motion compensation unit 296 has generated the predictive fragment associated with the current fragment and inverse transform module 294 has generated the decoded residual fragment associated with the current fragment, a fragment reconstruction module 300 may generate a reconstructed fragment associated with the current fragment by adding the predictive fragment and the decoded residual fragment. Fragment reconstruction module 300 may then store the reconstructed fragment into reference buffer 298.

Although not illustrated in the example of FIG. 11, decoder 18 may include a frame reconstruction module that reconstructs complete frames from fragments stored in reference buffer 298. This frame reconstruction module may use the exemplary operation illustrated in FIG. 8B to reconstruct the complete frames from fragments stored in reference buffer 298.

Figure 12:
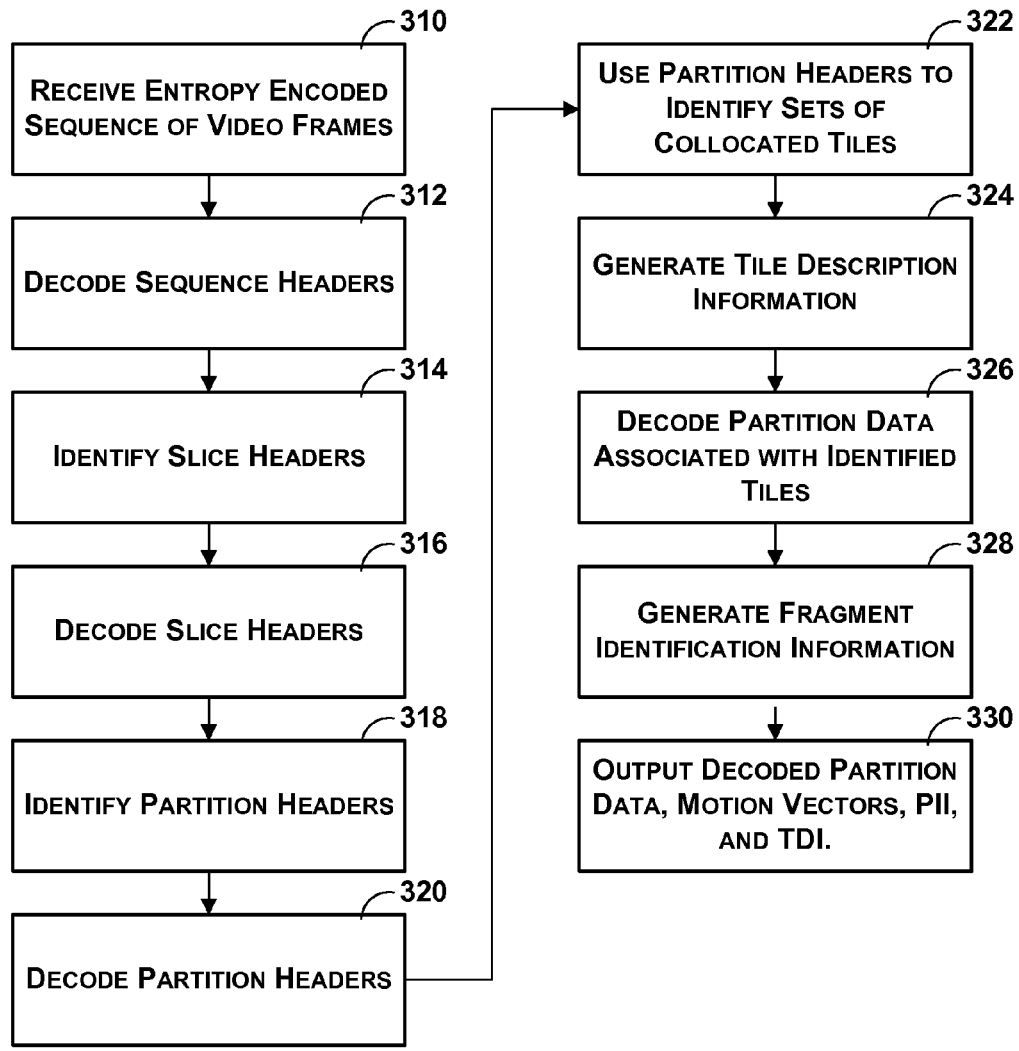
FIG. 12 is a flowchart illustrating an exemplary operation of the alternate implementation of the decoder presented in FIG. 11.

FIG. 12 is a flowchart illustrating an exemplary operation of the alternate implementation of decoder 18 illustrated in FIG. 11. Initially, entropy decoding unit 150 receives a media object that includes that includes encoded sequences of video frames (310). Next, sequence header decoding module 280 in entropy decoding unit 150 performs an entropy decoding operation on the sequence headers in the media object (312). Next, slice header decoding module 284 may use the decoded partition headers to identify the locations of slice headers within the media object (314). Slice header decoding module 284 may then decode the identified slice headers (316). Partition header decoding module 286 may then use the decoded slice headers to identify locations of partition headers within the media object (318). Partition header decoding module 286 may then decode the identified partition headers (320).

After partition header decoding module 286 decodes the identified partition headers, tile identification module 288 uses the decoded partition headers to identify sets of tiles for video frames in sequences of video frames (322). As discussed above, tile identification module 288 may use a variety of different techniques to identify sets of tiles for video frames of the sequence of video frames. In an alternate implementation, tile identification module 288 may receive data that indicates the sets of tiles separate from the media object. Tile identification module 288 may use this data to identify sets of tiles for video frames in sequences of video frames. After tile identification module 288 identifies the sets of tiles, tile identification module 288 may generate tile description information for each of the identified sets of tiles (324).

Next, partition data decoding module 290 decodes those encoded versions of partitions that are within the identified tiles (326). As a result of decoding the encoded version of the partitions, partition data decoding module 290 has generated sets of quantized coefficients associated with different fragments. Once partition data decoding module 290 decodes the encoded versions of the partitions, partition data decoding module 290 may output the decoded partition data, motion data, picture identification information ("PII"), and tile description information ("TDI") (330).

FIG. 13 is a flowchart illustrating an exemplary operation of buffer fill module 22 (FIG. 1) to store fragments into display buffers 24. When performing this operation, buffer fill module 22 effectively acts as a frame reassembly module.

In accordance with the example operation of FIG. 13, display buffers 24 include three buffers: $B_0$, $B_1$, and $B_2$. The use of these three buffers may allow buffer fill module 22 to reconstruct complete frames in display buffers $B_0$, $B_1$, and $B_2$. Thus, when buffer fill module 22 uses the exemplary operation of FIG. 13, it may be unnecessary for decoding module 18 to include or to use frame reconstruction module 162.

Initially, buffer fill module 22 retrieves from a fragment buffer a set of fragments associated with a frame $F_X$ (350). After retrieving the set of fragments associated with frame $F_X$, buffer fill module 22 determines whether frame $F_X$ is the first frame of a sequence of video frames (352).

If buffer fill module 22 determines that frame $F_X$ is the first frame of a sequence of video frames ("YES" of 352), buffer fill module 22 writes each of the fragments associated with frame $F_X$ to buffer $B_{(X \bmod 3)}$ (354). In order to write each of the fragments associated with frame $F_X$ to appropriate locations within buffer $B_{(X \bmod 3)}$, buffer fill module 22 may use the fragment identification information associated with the fragments to identify tile description information associated with the fragments. Buffer fill module 22 may then use the locations indicated in the tile description information to identify appropriate locations within buffer $B_{(X \bmod 3)}$.

Next, buffer fill module 22 copies the content of buffer $B_{(X \bmod 3)}$ to buffer $B_{((X+1) \bmod 3)}$ (356). After buffer fill module 22 copies the content of buffer $B_{(X \bmod 3)}$ to buffer $B_{((X+1) \bmod 3)}$, display unit 26 may display the content of buffer $B_{((X+2) \bmod 3)}$ (358). Once display unit 26 has displayed the content of buffer $B_{((x+2) \bmod 3)}$, buffer fill module 22 may increment the value of X (360). Buffer fill module 22 may then loop back and retrieve fragments associated with frame $F_X$ (350). Because buffer fill module 22 has incremented X, buffer fill module 22 retrieves fragments associated with the frame that follows the frame that buffer fill module 22 previously added to display buffers 24.

On the other hand, if buffer fill module 22 determines that frame $F_X$ is not the first frame of a sequence of video frames ("NO" of 352), buffer fill module 22 writes each of the fragments associated with the frame $F_X$ to appropriate locations in buffer $B_{(X \bmod 2)}$ (362). After buffer fill module 22 writes each of the fragments associated with the frame $F_X$ to the appropriate locations in buffer $B_{(X \bmod 2)}$, display unit 26 may display the content of buffer $B_{((X+1) \bmod 2)}$ (364). Once display unit 26 has displayed the content of buffer $B_{((X+1) \bmod 2)}$, buffer fill module 22 may increment the value of X (360). Buffer fill module 22 may then loop back and retrieve pictures associated with frame $F_X$ (350).

Note that while this disclosure explains FIG. 13 with reference to three buffers, operations may exist with higher numbers of buffers.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

Various example implementations have been described. For example, implementations have been described with regard to video frames. However, the foregoing description and following claims may also be applicable to video slices or a set of consecutive images as from a still camera at an arbitrary capture rate. Furthermore, techniques for encoding and decoding sequences of video frames using fragmentary reference pictures have been primarily described in the context of motion compensation coding techniques. However, the use of fragmentary reference pictures, as described herein, may also be used in other processing or coding contexts, such as for scaling, edge enhancement, or the like. Accordingly, the units, modules, or circuitry described herein as performing motion compensation for a current tile of a current video frame based on one or more of the reference fragments, could alternatively be units, modules, or circuitry that perform scaling or edge enhancement (or possibly another video processing technique) for a current tile of a current video frame based on one or more of the reference fragments. These and other implementations are within the scope of the following claims.

The invention claimed is:

1. A method comprising:
   storing reference fragments comprising video data associated with a set of tiles of video frames in a sequence of video frames, wherein each tile in the set of tiles represents a subset of partitions for the respective video frame; and
   performing motion compensation for a current tile of a current video frame based on one or more of the reference fragments;
   wherein the current tile is co-located with the tiles in the set of tiles;
   wherein the method further comprises automatically identifying the set of tiles; and
   wherein automatically identifying the set of tiles comprises:
      identifying a set of active partitions in each of the video frames, wherein each of the active partitions comprises at least one of a motion vector indicating at least some displacement relative to a partition of a video frame of the reference fragments, and a non-zero residual value vis-à-vis a co-located partition of a video frame of the reference fragments; and
      for each given one of the video frames, identifying a tile of the given one of the video frames such that the tile includes the identified set of active partitions of the given one of the video frames and partitions of the given one of the video frames that are co-located with active partitions in the identified sets of active partitions of other ones of the video frames.

2. The method of claim 1:
   wherein performing motion compensation comprises generating a predictive fragment associated with the current tile of the current video frame; and
   wherein the method further comprises:
      extracting a fragment associated with the current tile from the current video frame;
      using the extracted fragment and the predictive fragment to generate a residual fragment associated with the current tile of the current video frame;
      performing a transform on the residual fragment in order to generate a set of coefficients;
      quantizing the set of coefficients, thereby generating a set of quantized coefficients;
      entropy encoding the set of quantized coefficients; and
      outputting the entropy encoded set of quantized coefficients as part of a media object;
      inverse quantizing the set of quantized coefficients, thereby generating an inverse quantized set of coefficients;
      performing an inverse of the transform on the inverse quantized set of coefficients in order to generate a decoded residual fragment;
      generating a reconstructed fragment using the predictive fragment and the decoded residual fragment; and
      storing the reconstructed fragment for use as a reference fragment.

3. The method of claim 1,
   wherein performing motion compensation comprises generating a predictive fragment associated with the current tile of the current video frame; and
   wherein the method further comprises:
      receiving a media object that includes a set of data associated with the current tile of the current video frame;
      generating a residual fragment based on the set of data;
      using the predictive fragment and the residual fragment to generate a reconstructed fragment associated with the current tile of the current video frame; and
      using the reconstructed fragment to reconstruct the current video frame.

4. The method of claim 3, wherein using the reconstructed fragment to reconstruct the current video frame comprises modifying a previously decoded complete video frame such that the reconstructed fragment is specified in a tile of the previously decoded complete video frame that is co-located with the current tile of the current video frame.

5. The method of claim 1,
   wherein the reference fragments are interlaced; and
   wherein performing motion compensation for the current tile comprises performing de-interlacing motion compensation for the current tile based on one or more of the reference fragments.

6. The method of claim 1, wherein the method further comprises adding the current video frame between two video frames in the sequence of video frames as part of an operation to increase the frame rate of the sequence of video frames.

7. A device comprising:
   a reference buffer that stores reference fragments comprising video data associated with a set of tiles of video frames in a sequence of video frames, wherein each tile in the set of tiles represents a subset of partitions for the respective video frame; and
   a motion compensation unit that performs motion compensation for a current tile of a current video frame based on one or more of the reference fragments;

wherein the current tile is co-located with the tiles in the set of tiles; and
wherein the device further comprises a tile identification module that automatically identifies the set of tiles; and
wherein the tile identification module comprises:
  a partition activity module that identifies a set of active partitions in each of the video frames, wherein each of the active partitions comprises a motion vector indicating at least some displacement relative to a partition of a video frame of the reference fragments, and wherein each of the active partitions comprises a non-zero residual value vis-à-vis a co-located partition of a video frame of the reference fragments; and
  a tile construction module that, for each given one of the video frames, identifies a tile of the given one of the video frames such that the tile includes the identified set of active partitions of the given one of the video frames and partitions of the given one of the video frames that are co-located with active partitions in the identified sets of active partitions of other ones of the video frames.

8. The device of claim 7,
wherein, when the motion compensation unit performs motion compensation for the current tile, the motion compensation unit generates a predictive fragment associated with the current tile of the current video frame; and
wherein the device further comprises:
  a fragment extraction module that extracts a fragment associated with the current tile from the current video frame,
  a module that uses the extracted fragment and the predictive fragment to generate a residual fragment associated with the current tile of the current video frame;
  a block transform unit that performs a transform on the residual fragment in order to generate a set of coefficients;
  a quantization module that quantizes the set of coefficients, thereby generating a set of quantized coefficients;
  an entropy encoding unit that entropy encodes the set of quantized coefficients;
  an output module that outputs the entropy encoded set of quantized coefficients as part of a media object;
  an inverse quantization module that inverse quantizes the set of quantized coefficients, thereby generating an inverse quantized set of coefficients;
  an inverse transform unit that performs an inverse of the transform on the inverse quantized set of coefficients in order to generate a decoded residual fragment; and
  a module that generates a reconstructed fragment using the predictive fragment and the decoded residual fragment,
  wherein the reference buffer stores the reconstructed fragment for use as a reference fragment.

9. The device of claim 7,
wherein, when the motion compensation unit performs motion compensation for the current tile, the motion compensation unit generates a predictive fragment associated with the current tile of the current video frame; and
wherein the device receives a media object that includes a set of data associated with the current tile of the current video frame; and
wherein the device further comprises:
  a decoder that generates a residual fragment based on the set of data;
  a module that uses the predictive fragment and the residual fragment to generate a reconstructed fragment associated with the current tile of the current video frame; and
  a frame reassembly module that uses the reconstructed fragment to reconstruct the current video frame.

10. The device of claim 9, wherein the frame reassembly module modifies a previously decoded complete video frame such that the reconstructed fragment is specified in a tile of the previously decoded complete video frame that is co-located with the current tile of the current video frame.

11. The device of claim 7,
wherein the reference fragments are interlaced; and
wherein the motion compensation unit performs the motion compensation for the current tile by performing de-interlacing motion compensation for the current tile based on one or more of the reference fragments.

12. The device of claim 7, wherein the device further comprises a post-processor that adds the current video frame between two video frames in the sequence of video frames as part of an operation to increase the frame rate of the sequence of video frames.

13. A device comprising:
means for storing reference fragments comprising video data associated with a set of tiles of video frames in a sequence of video frames, wherein each tile in the set of tiles represents a subset of partitions for the respective video frame; and
means for performing motion compensation for a current tile of a current video frame based on one or more of the reference fragments;
wherein the device further comprises means for automatically identifying the set of tiles;
wherein the means for automatically identifying the set of tiles comprises:
  means for identifying a set of active partitions in each of the video frames wherein each of the active partitions comprises at least one of a motion vector indicating at least some displacement relative to a partition of a video frame of the reference fragments, and a non-zero residual value vis-à-vis a co-located partition of a video frame of the reference fragments; and
  means for identifying, for each given one of the video frames, a tile of the given one of the video frames such that the tile includes the identified set of active partitions of the given one of the video frames and partitions of the given one of the video frames that are co-located with active partitions in the identified sets of active partitions of other ones of the video frames; and
wherein the current tile is co-located with the tiles in the set of tiles.

14. The device of claim 13,
wherein, when the means for performing motion compensation performs motion compensation for the current tile, the means for performing motion compensation generates a predictive fragment associated with the current tile of the current video frame; and
wherein the device further comprises:
  means for extracting a fragment associated with the current tile from the current video frame,
  means for using the extracted fragment and the predictive fragment to generate a residual fragment associated with the current tile of the current video frame;
  means for performing a transform on the residual fragment in order to generate a set of coefficients;

means for quantizing the set of coefficients, thereby generating a set of quantized coefficients;

means for entropy encoding the set of quantized coefficients;

means for outputting the entropy encoded set of quantized coefficients as part of a media object;

means for inverse quantizing the set of quantized coefficients, thereby generating an inverse quantized set of coefficients;

means for performing an inverse of the transform on the inverse quantized set of coefficients in order to generate a decoded residual fragment; and means for generating a reconstructed fragment using the predictive fragment and the decoded residual fragment, wherein the means for storing the set of fragments stores the reconstructed fragment for use as a reference fragment.

15. The device of claim 13, wherein, when the means for performing motion compensation performs motion compensation for the current tile, the means for performing motion compensation generates a predictive fragment associated with the current tile of the current video frame;

wherein the device receives a media object that includes a set of data associated with the current tile of the current video frame; and wherein the device further comprises:

means for generating a residual fragment based on the set of data;

means for using the predictive fragment associated with the current tile of the current video frame and the residual fragment to generate a reconstructed fragment associated with the current tile of the current video frame; and means for using the reconstructed fragment to reconstruct the current video frame.

16. The device of claim 15, wherein the means for using the reconstructed fragment to reconstruct the current video frame modifies a previously decoded complete video frame such that the reconstructed fragment is specified in a tile of the previously decoded complete video frame that is co-located with the current tile of the current video frame.

17. The device of claim 13, wherein the reference fragments are interlaced; and wherein the means for performing motion compensation performs the motion compensation for the current tile by performing de-interlacing motion compensation for the current tile based on one or more of the reference fragments.

18. The device of claim 13, wherein the device further comprises means for adding the current video frame between two video frames in the sequence of video frames as part of an operation to increase the frame rate of the sequence of video frames.

19. A computer-readable medium comprising executable instructions that, when executed by one or more processors, cause one or more processors to:

store reference fragments comprising video data associated with a set of tiles of video frames in a sequence of video frames, wherein each tile in the set of tiles represents a subset of partitions for the respective video frame; and perform motion compensation for a current tile of a current video frame based on one or more of the reference fragments;

wherein the instructions further cause the one or more processors to automatically identify the set of tiles;

wherein the instructions cause the one or more processors to automatically identify the set of tiles at least in part by causing the one or more processors to:

identify a set of active partitions in each of the video frames, wherein each of the active partitions comprises at least one of a motion vector indicating at least some displacement relative to a partition of a video frame of the reference fragments, and a non-zero residual value vis-à-vis a co-located partition of a video frame of the reference fragments; and for each given one of the video frames, identify a tile of the given one of the video frames such that the tile includes the identified set of active partitions of the given one of the video frames and partitions of the given one of the video frames that are co-located with active partitions in the identified sets of active partitions of other ones of the video frames; and wherein the current tile is co-located with the tiles in the set of tiles.

20. The computer-readable medium of claim 19, wherein the instructions cause the one or more processors to perform motion compensation at least in part by causing the one or more processors to generate a predictive fragment associated with the current tile of the current video frame; and wherein the instructions further cause the one or more processors to:

extract a fragment associated with the current tile from the current video frame;

use the extracted fragment and the predictive fragment to generate a residual fragment;

perform a transform on the residual fragment in order to generate a set of coefficients;

quantize the set of coefficients, thereby generating a set of quantized coefficients;

entropy encode the set of quantized coefficients;

output the entropy encoded set of quantized coefficients as part of a media object;

inverse quantize the set of quantized coefficients, thereby generating an inverse quantized set of coefficients;

perform an inverse of the transform on the inverse quantized set of coefficients in order to generate a decoded residual fragment;

generate a reconstructed fragment using the predictive fragment and the decoded residual fragment; and store the reconstructed fragment for use as a reference fragment.

21. The computer-readable medium of claim 19, wherein the instructions cause the one or more processors to perform motion compensation at least in part by causing the one or more processors to generate a predictive fragment associated with the current tile of the current video frame; and wherein the instructions further cause the one or more processors to:

receive a media object that includes a set of data associated with the current tile of the current video frame;

generate a residual fragment based on the set of data;

use the predictive fragment associated with the tile of the current video frame and the residual fragment to generate a reconstructed fragment associated with the current frame; and use the reconstructed fragment to reconstruct the current video frame.

22. The computer-readable medium of claim 21, wherein the instructions cause the one or more processors to use the reconstructed fragment to reconstruct the current video frames at least in part by causing the one or more processors to modify a previously decoded complete video frame such that the reconstructed fragment is specified in a tile of the previously decoded complete video frame that is co-located with the current tile of the current video frame.

23. The computer-readable medium of claim 19,
wherein the reference fragments are interlaced; and
wherein performing motion compensation for the current tile comprises performing de-interlacing motion compensation for the current tile based on one or more of the reference fragments.

24. The computer-readable medium of claim 19, wherein the instructions further cause the one or more processors to adding the current video frame between two video frames in the sequence of video frames as part of an operation to increase the frame rate of the sequence of video frames.

25. An integrated circuit comprising:
circuitry that stores reference fragments comprising video data associated with a set of tiles of video frames in a sequence of video frames, wherein each tile in the set of tiles represents a subset of partitions for the respective video frame; and
circuitry that performs motion compensation for a current tile of a current video frame based on one or more of the reference fragments;
wherein the integrated circuit further comprises circuitry that automatically identifies the set of tiles;
wherein the circuitry that automatically identifies the set of tiles comprises:
circuitry that identifies a set of active partitions in each of the video frames, wherein each of the active partitions comprises at least one of a motion vector indicating at least some displacement relative to a partition of a video frame of the reference fragments, and a non-zero residual value vis-à-vis a co-located partition of a video frame of the reference fragments; and
circuitry that identifies, for each given one of the video frames, a tile of the given one of the video frames such that the tile includes the identified set of active partitions of the given one of the video frames and partitions of the given one of the video frames that are co-located with active partitions in the identified sets of active partitions of other ones of the video frames; and
wherein the current tile is co-located with the tiles in the set of tiles.

26. The integrated circuit of claim 25,
wherein, when the circuitry that performs motion compensation performs motion compensation for the current tile, the circuitry that performs motion compensation generates a predictive fragment associated with the current tile of the current video frame; and
wherein the integrated circuit further comprises:
circuitry that extracts a fragment associated with the current tile from the current video frame,
circuitry that uses the extracted fragment and the predictive fragment to generate a residual fragment associated with the current tile of the current video frame;
circuitry that performs a transform on the residual fragment in order to generate a set of coefficients;
circuitry that quantizes the set of coefficients, thereby generating a set of quantized coefficients;
circuitry that entropy encodes the set of quantized coefficients; and
circuitry that outputs the entropy encoded set of quantized coefficients as part of a media object;
circuitry that inverse quantizes the set of quantized coefficients, thereby generating an inverse quantized set of coefficients;
circuitry that performs an inverse of the transform on the inverse quantized set of coefficients in order to generate a decoded residual fragment; and
circuitry that generates a reconstructed fragment using the predictive fragment and the decoded residual fragment,
wherein the circuitry that stores the set of fragments stores the reconstructed fragment for use as a reference fragment.

27. The integrated circuit of claim 25,
wherein, when the circuitry that performs motion compensation performs motion compensation for the current tile, the circuitry that performs motion compensation generates a predictive fragment associated with the current tile of the current video frame;
wherein the integrated circuit receives a media object that includes a set of data associated with the current tile of the current video frame; and
wherein the integrated circuit further comprises:
circuitry that generates a residual fragment based on the set of data;
circuitry that uses the predictive fragment associated with the current tile of the current video frame and the residual fragment to generate a reconstructed fragment associated with the current tile of the current video frame; and
circuitry that uses the reconstructed fragment to reconstruct the current video frame.

28. The integrated circuit of claim 27, wherein the circuitry for using the reconstructed fragment to reconstruct the current video frame modifies a previously decoded complete video frame such that the reconstructed fragment is specified in a tile of the previously decoded complete video frame that is co-located with the current tile of the current video frame.

29. The integrated circuit of claim 25,
wherein the reference fragments are interlaced; and
wherein the circuitry that performs motion compensation performs the motion compensation for the current tile by performing de-interlacing motion compensation for the current tile based on one or more of the reference fragments.

30. The integrated circuit of claim 25, wherein the integrated circuit further comprises circuitry that adds the current video frame between two video frames in the sequence of video frames as part of an operation to increase the frame rate of the sequence of video frames.

31. A method comprising:
storing reference fragments comprising video data associated with a set of tiles of video frames in a sequence of video frames, wherein each tile in the set of tiles represents a subset of partitions for the respective video frame; and
performing a video processing technique for a current tile of a current video frame based on one or more of the reference fragments;
wherein the current tile is co-located with the tiles in the set of tiles;
wherein the method further comprises automatically identifying the set of tiles; and
wherein automatically identifying the set of tiles comprises:
identifying a set of active partitions in each of the video frames, wherein each of the active partitions comprises at least one of a motion vector indicating at least some displacement relative to a partition of a video frame of the reference fragments, and a non-zero residual value vis-à-vis a co-located partition of a video frame of the reference fragments;

for each given one of the video frames, identifying a tile of the given one of the video frames such that the tile includes the identified set of active partitions of the given one of the video frames and partitions of the given one of the video frames that are co-located with active partitions in the identified sets of active partitions of other ones of the video frames.

32. The method of claim 31, wherein performing the video processing technique comprises one of:

performing motion compensation for a current tile of a current video frame based on one or more of the reference fragments;

performing scaling for a current tile of a current video frame based on one or more of the reference fragments; and performing edge enhancement for a current tile of a current video frame based on one or more of the reference fragments.

33. A device comprising:

a reference buffer that stores reference fragments comprising video data associated with a set of tiles of video frames in a sequence of video frames, wherein each tile in the set of tiles represents a subset of partitions for the respective video frame; and a unit that performs a video processing technique for a current tile of a current video frame based on one or more of the reference fragments;

wherein the current tile is co-located with the tiles in the set of tiles; and wherein the device further comprises a tile identification module that automatically identifies the set of tiles; and wherein the tile identification module comprises:

a partition activity module that identifies a set of active partitions in each of the video frames, wherein each of the active partitions comprises a motion vector indicating at least some displacement relative to a partition of a video frame of the reference fragments, and wherein each of the active partitions comprises a non-zero residual value vis-à-vis a co-located partition of a video frame of the reference fragments; and a tile construction module that, for each given one of the video frames, identifies a tile of the given one of the video frames such that the tile includes the identified set of active partitions of the given one of the video frames and partitions of the given one of the video frames that are co-located with active partitions in the identified sets of active partitions of other ones of the video frames.

34. The device of claim 33, wherein the unit that performs the video processing technique comprises one of:

a motion compensation unit that perform motion compensation for a current tile of a current video frame based on one or more of the reference fragments;

a scaling unit that performs scaling for a current tile of a current video frame based on one or more of the reference fragments; and an edge enhancement unit that performs edge enhancement for a current tile of a current video frame based on one or more of the reference fragments.

35. A device comprising:

means for storing reference fragments comprising video data associated with a set of tiles of video frames in a sequence of video frames, wherein each tile in the set of tiles represents a subset of partitions for the respective video frame; and means for performing a video processing technique for a current tile of a current video frame based on one or more of the reference fragments;

wherein the device further comprises means for automatically identifying the set of tiles;

wherein the means for automatically identifying the set of tiles comprises:

means for identifying a set of active partitions in each of the video frames wherein each of the active partitions comprises at least one of a motion vector indicating at least some displacement relative to a partition of a video frame of the reference fragments, and a non-zero residual value vis-à-vis a co-located partition of a video frame of the reference fragments; and means for identifying, for each given one of the video frames, a tile of the given one of the video frames such that the tile includes the identified set of active partitions of the given one of the video frames and partitions of the given one of the video frames that are co-located with active partitions in the identified sets of active partitions of other ones of the video frames; and wherein the current tile is co-located with the tiles in the set of tiles.

36. The device of claim 35, wherein means for performing the video processing technique comprises one of:

means for performing motion compensation for a current tile of a current video frame based on one or more of the reference fragments;

means for performing scaling for a current tile of a current video frame based on one or more of the reference fragments; and means for performing edge enhancement for a current tile of a current video frame based on one or more of the reference fragments.

37. A computer-readable medium comprising executable instructions that, when executed by one or more processors, cause one or more processors to:

store reference fragments comprising video data associated with a set of tiles of video frames in a sequence of video frames, wherein each tile in the set of tiles represents a subset of partitions for the respective video frame; and perform a video processing technique for a current tile of a current video frame based on one or more of the reference fragments;

wherein the instructions further cause the one or more processors to automatically identify the set of tiles;

wherein the instructions cause the one or more processors to automatically identify the set of tiles at least in part by causing the one or more processors to:

identify a set of active partitions in each of the video frames, wherein each of the active partitions comprises at least one of a motion vector indicating at least some displacement relative to a partition of a video frame of the reference fragments, and a non-zero residual value vis-à-vis a co-located partition of a video frame of the reference fragments; and for each given one of the video frames, identify a tile of the given one of the video frames such that the tile includes the identified set of active partitions of the given one of the video frames and partitions of the given one of the video frames that are co-located with active partitions in the identified sets of active partitions of other ones of the video frames; and wherein the current tile is co-located with the tiles in the set of tiles.

38. The computer readable medium of claim 37, wherein the instructions cause the one or more processors to perform the video processing technique by performing one of:

motion compensation for a current tile of a current video frame based on one or more of the reference fragments;

scaling for a current tile of a current video frame based on one or more of the reference fragments; and edge enhancement for a current tile of a current video frame based on one or more of the reference fragments.

39. An integrated circuit comprising:

circuitry that stores reference fragments comprising video data associated with a set of tiles of video frames in a sequence of video frames, wherein each tile in the set of tiles represents a subset of partitions for the respective video frame; and circuitry that performs a video processing technique for a current tile of a current video frame based on one or more of the reference fragments;

wherein the integrated circuit further comprises circuitry that automatically identifies the set of tiles;

wherein the circuitry that automatically identifies the set of tiles comprises:

circuitry that identifies a set of active partitions in each of the video frames, wherein each of the active partitions comprises at least one of a motion vector indicating at least some displacement relative to a partition of a video frame of the reference fragments, and a non-zero residual value vis-à-vis a co-located partition of a video frame of the reference fragments; and circuitry that identifies, for each given one of the video frames, a tile of the given one of the video frames such that the tile includes the identified set of active partitions of the given one of the video frames and partitions of the given one of the video frames that are co-located with active partitions in the identified sets of active partitions of other ones of the video frames; and wherein the current tile is co-located with the tiles in the set of tiles.

40. The integrated circuit of claim 39, wherein the circuitry that performs a video processing technique comprises one of:

circuitry that performs motion compensation for a current tile of a current video frame based on one or more of the reference fragments;

circuitry that performs scaling for a current tile of a current video frame based on one or more of the reference fragments; and circuitry that performs edge enhancement for a current tile of a current video frame based on one or more of the reference fragments.

* * * * *